United States Patent
Mohassel et al.

(10) Patent No.: US 12,033,045 B2
(45) Date of Patent: *Jul. 9, 2024

(54) TWO-SERVER PRIVACY-PRESERVING CLUSTERING

(71) Applicant: Visa International Service Association, San Francisco, CA (US)

(72) Inventors: Payman Mohassel, San Jose, CA (US); Ni Trieu, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/302,965

(22) Filed: Apr. 19, 2023

(65) Prior Publication Data

US 2023/0252358 A1    Aug. 10, 2023

Related U.S. Application Data

(63) Continuation of application No. 16/675,499, filed on Nov. 6, 2019, now Pat. No. 11,663,521.

(51) Int. Cl.
*G06F 7/58* (2006.01)
*G06F 9/30* (2018.01)
(Continued)

(52) U.S. Cl.
CPC ............. *G06N 20/00* (2019.01); *G06F 7/582* (2013.01); *G06F 9/30029* (2013.01);
(Continued)

(58) Field of Classification Search
CPC ......... H04L 9/008; H04L 63/04; H04L 63/20; G06N 7/00; G06N 20/00; G06N 3/088;
(Continued)

(56) References Cited

U.S. PATENT DOCUMENTS 9,747,470 B2 * 8/2017 Patey ...................... G06F 21/71
2008/0021899 A1 * 1/2008 Avidan .............. G06F 18/24147
(Continued)

FOREIGN PATENT DOCUMENTS

| CN | 107145791 A | | 9/2017 |
|----|----|----|----|
| EP | 3475868 | * | 5/2019 |
| KR | 20160030874 A | | 3/2016 |

OTHER PUBLICATIONS

Mohassel et al., SecureML: A System for Scalable Privacy-Preserving Machine Learning, IEEE Symposium, 2017.*
(Continued)

*Primary Examiner* — Jungwon Chang
(74) *Attorney, Agent, or Firm* — Kilpatrick Townsend & Stockton LLP

(57) ABSTRACT

Described herein are systems and techniques for privacy-preserving unsupervised learning. The disclosed system and methods can enable separate computers, operated by separate entities, to perform unsupervised learning jointly based on a pool of their respective data, while preserving privacy. The system improves efficiency and scalability, while preserving privacy and avoids leaking a cluster identification. The system can jointly compute a secure distance via privacy-preserving multiplication of respective data values x and y from the computers based on a 1-out-of-N oblivious transfer (OT). In various embodiments, N may be 2, 4, or some other number of shares. A first computer can express its data value x in base-N. A second computer can form an $\ell \times N$ matrix comprising $\ell$ random numbers $m_{i,0}$ and the remaining elements $m_{i,j}=(yjN^i-m_{i,0})$ mod $N^\ell$. The first computer can receive an output vector from the OT, having components $m_i=(yx_i N^i-m_{i,0})$ mod $N^\ell$.

20 Claims, 14 Drawing Sheets

(51) Int. Cl.
  *G06F 9/38* (2018.01)
  *G06N 3/088* (2023.01)
  *G06N 7/00* (2023.01)
  *G06N 20/00* (2019.01)
  *H04L 9/40* (2022.01)

(52) U.S. Cl.
  CPC ........ *G06F 9/30036* (2013.01); *G06F 9/3891* (2013.01); *G06N 3/088* (2013.01); *G06N 7/00* (2013.01); *H04L 63/04* (2013.01); *H04L 63/20* (2013.01)

(58) Field of Classification Search
  CPC ............... G06F 9/3891; G06F 9/30036; G06F 9/30029; G06F 7/582
  See application file for complete search history.

(56) References Cited

U.S. PATENT DOCUMENTS

| | | | |
|---|---|---|---|
| 2011/0026781 | A1 | 2/2011 | Osadchy et al. |
| 2015/0341326 | A1* | 11/2015 | Premnath ............... H04L 9/3218 713/171 |
| 2016/0020904 | A1 | 1/2016 | Ioannidis et al. |
| 2016/0026825 | A1 | 1/2016 | Patey et al. |
| 2016/0119119 | A1* | 4/2016 | Calapodescu ....... G06F 21/6227 380/30 |
| 2016/0182222 | A1 | 6/2016 | Rane et al. |
| 2017/0359321 | A1* | 12/2017 | Rindal .................. G06F 21/602 |
| 2017/0372226 | A1 | 12/2017 | Costa et al. |
| 2018/0276417 | A1* | 9/2018 | Cerezo Sanchez ..... H04L 9/008 |
| 2020/0242466 | A1* | 7/2020 | Mohassel ................ H04L 9/008 |
| 2021/0091952 | A1* | 3/2021 | Wentz ................... H04L 9/3278 |
| 2021/0209247 | A1* | 7/2021 | Mohassel ............. A63B 21/023 |

OTHER PUBLICATIONS

U.S. Appl. No. 16/675,499, Non-Final Office Action, dated Aug. 26, 2022, 14 pages.
U.S. Appl. No. 16/675,499, Notice of Allowance, dated Jan. 23, 2023, 5 pages.
Chen et al., "SANNS: Scaling Up Secure Approximate k-Nearest Neighbors Search", Available Online at: https://arxiv.org/pdf/1904.02033.pdf, Nov. 20, 2019, pp. 1-19.
Application No. CN202080076982.6, Office Action, dated Nov. 15, 2022, 10 pages.
Dahl et al., "On Secure Two-party Integer Division", The 16th International Conference on Financial Cryptography and Data Security, Available Online at: https://eprint.iacr.org/2012/164.pdf, 2012, 24 pages.
Application No. EP20885029.7, Extended European Search Report, dated Nov. 24, 2022, 9 pages.
Jaschke et al., "Unsupervised Machine Learning on Encrypted Data", Available Online at: https://madoc.bib.uni-mannheim.de/46393/1/2018-411.pdf, 2018, 30 pages.
Meng et al., "Private Two-Party Cluster Analysis Made Formal & Scalable", Available online at: https://arxiv.org/abs/1904.04475, Oct. 28, 2019, 19 pages.
Mohassel et al., "Practical Privacy-Preserving K-Means Clustering", Proceedings on Privacy Enhancing Technologies, Issue 4, Aug. 17, 2020, pp. 414-433.
Application No. PCT/US2020/058980, International Search Report and Written Opinion, dated Feb. 22, 2021, 9 pages.
Schoppmann et al., "Private Nearest Neighbors Classification in Federated Databases", Cryptology ePrint Archive: Report 2018/289, 2018, 16 pages.
Su et al., "Collaborative Agglomerative Document Clustering With Limited Information Disclosure", Security and Communication Networks, vol. 7, No. 6, Jun. 14, 2013, pp. 964-978.
Vaidya et al., "Privacy-Preserving K-Means Clustering over Vertically Partitioned Data", In: KDD '03: Proceedings of the ninth ACM SIGKDD international conference on Knowledge discovery and data mining, Aug. 2003, pp. 206-215.
Yuan et al., "Practical Privacy-Preserving MapReduce Based K-Means Clustering Over Large- Scale Dataset", In: IEEE Transactions on Cloud Computing, vol. 7, No. 2, Jun. 2019, pp. 568-579.
Mohassel "Practical Privacy-Preserving K-means Clustering", Cryptology ePrint Archive, Oct. 5, 2019, pp. 1-30.
Application No. SG11202203263Q, Written Opinion, Mailed on Feb. 27, 2024, 5 pages.

* cited by examiner

US 12,033,045 B2

TWO-SERVER PRIVACY-PRESERVING CLUSTERING

CROSS-REFERENCE TO RELATED APPLICATIONS

This application is a Continuation of U.S. patent application Ser. No. 16/675,499, filed on Nov. 6, 2019, the disclosure of which is herein incorporated by reference in its entirety for all purposes.

BACKGROUND

Machine learning (ML) methods, and specifically unsupervised learning methods such as k-means clustering and hierarchical clustering, are highly useful in applications such as identifying patterns in transactions, market research, social networks, search, categorizing and typifying observations, etc.

In some cases, disparate entities with separate data sets may wish to cluster the data in order to analyze information, while also keeping the data private. A limited number of methods exist to conduct privacy-preserving learning, but such methods may be constrained by issues such as efficiency, scaling to large datasets, and data leaking.

Embodiments of the disclosure address these and other problems, individually and collectively.

BRIEF SUMMARY

Described herein are systems and techniques for privacy-preserving unsupervised learning. The disclosed system and methods can enable separate computers, operated by separate entities, to perform unsupervised learning jointly based on a pool of their respective data, while preserving privacy. The system improves efficiency and scalability to large datasets while preserving privacy and avoids leaking a cluster identification.

In an embodiment, the system can jointly compute a secure distance via privacy-preserving multiplication of respective data values x and y from the computers based on a 1-out-of-N oblivious transfer (OT). In various embodiments, N may be 2, 4, or some other number of shares. A first computer can express its data value x in base-N. A second computer can form an $\ell \times N$ matrix comprising N random numbers $m_{i,0}$ and the remaining elements $m_{i,j} = (yjN^i - m_{i,0})$ mod $N^\ell$. The first computer can receive an output vector from the OT, having components $m_i = m_{i,x i} = (yx_i N^i - m_{i,0})$.

In an embodiment, a first computer and a second computer can jointly compute a secure distance, by at least performing privacy-preserving multiplication of a first data value of the first computer and a second data value of the second computer based on a 1-out-of-N oblivious transfer (OT) corresponding to a number N of shares. The privacy-preserving multiplication may further comprise expressing, by the first computer, the first data value as a first vector having a number L of components, wherein a respective component, having an index i, comprises a respective decomposition coefficient of the first data value in a base equal to N. The privacy-preserving multiplication may further comprise forming, by the second computer, a respective N-component vector having the index i of the respective decomposition coefficient and a second index. The first computer can receive an output vector of the 1-out-of-N OT, wherein a component, having an index i, of the output vector comprises a component of the respective N-component vector, the component having the index i and having the second index corresponding to the respective decomposition coefficient of the first data value in the base equal to N. The first and/or second computer may then privately assign data to a respective cluster of a plurality of clusters based on the secure distance.

In an embodiment, the first component of the respective N-component vector, having the second index equal to 0, can comprise a respective pseudo-random number. A respective remaining component, having the second index equal to j, can comprise the second data value multiplied by j and by N raised to a power of i, minus the first component of the respective N-component vector.

In an embodiment, the second computer can obtain a second output vector of the 1-out-of-N OT. A component, having an index i, of the second output vector may comprise a component of the respective N-component vector, the component having the index i and having the second index 0.

In an embodiment, privately assigning the data to the respective cluster of the plurality of clusters further comprises identifying, via a garbled circuit, a best match cluster of the plurality of clusters for a respective element of a plurality of elements of the data. The best match cluster may have a centroid with a minimum distance to the respective element. Privately assigning the data to the respective cluster of the plurality of clusters further comprises representing the best match cluster as a binary vector comprising a cluster flag for the respective element.

In an embodiment, performing the privacy-preserving unsupervised learning further comprises privately updating a centroid of a cluster by at least multiplying, for a respective element of a plurality of elements of the data and via a second OT and a third OT, a combined first share and second share of a cluster flag for the cluster and the respective element by a combined first share and second share of a position vector for the respective element. The first share of the cluster flag and the first share of the position vector may belong to the first computer. The second share of the cluster flag and the second share of the position vector may belong to the second computer. Privately updating the centroid of the cluster may further comprise summing a product of the multiplying over the plurality of elements. Privately updating the centroid of the cluster may further comprise dividing the summed product by a sum over the plurality of elements of the combined first share and second share of the cluster flag. Privately updating the centroid of the cluster may further comprise updating the centroid based on a result of the dividing.

In an embodiment, the first share and second share of the cluster flag are combined by exclusive OR.

In an embodiment, the privacy-preserving unsupervised learning comprises k-means clustering. The k-means clustering may further comprise selecting a plurality of seed clusters. The k-means clustering may further comprise jointly computing, based on the secure distance, a distance between a respective position vector of a respective element of the data and a respective centroid of a respective seed cluster. The respective position vector may be shared among the first computer and the second computer. The k-means clustering may further comprise identifying a first cluster having a minimum distance to the respective position vector. The k-means clustering may further comprise assigning the respective element to the first cluster. The k-means clustering may further comprise updating a first centroid of the first cluster based on an average of position vectors of elements of the data assigned to the first cluster, including the respective position vector.

In an embodiment, the privacy-preserving unsupervised learning comprises hierarchical clustering.

In an embodiment, N may equal 2 and the 1-out-of-N OT may comprise 1-out-of-2 OT. Alternatively, in an embodiment, N may equal 4 and the 1-out-of-N OT may comprise 1-out-of-4 OT.

In an embodiment, the secure distance comprises a secure Euclidean distance.

In an embodiment, the first computer initially has the first data value and receives a first output share value. The second computer may initially have the second data value and may receive a second output share value. The first output share value and second output share value may sum to a product of the first data value and the second data value.

In an embodiment, the second data value may adaptively change. A later iteration may reuse the 1-out-of-N OT from a first iteration.

These and other embodiments of the disclosure are described in further detail below. For example, other embodiments are directed to systems, computing systems, devices, and computer readable media associated with methods described herein.

A better understanding of the nature and advantages of embodiments of the present disclosure may be gained with reference to the following detailed description and the accompanying drawings.

TERMS

Figure 1A:
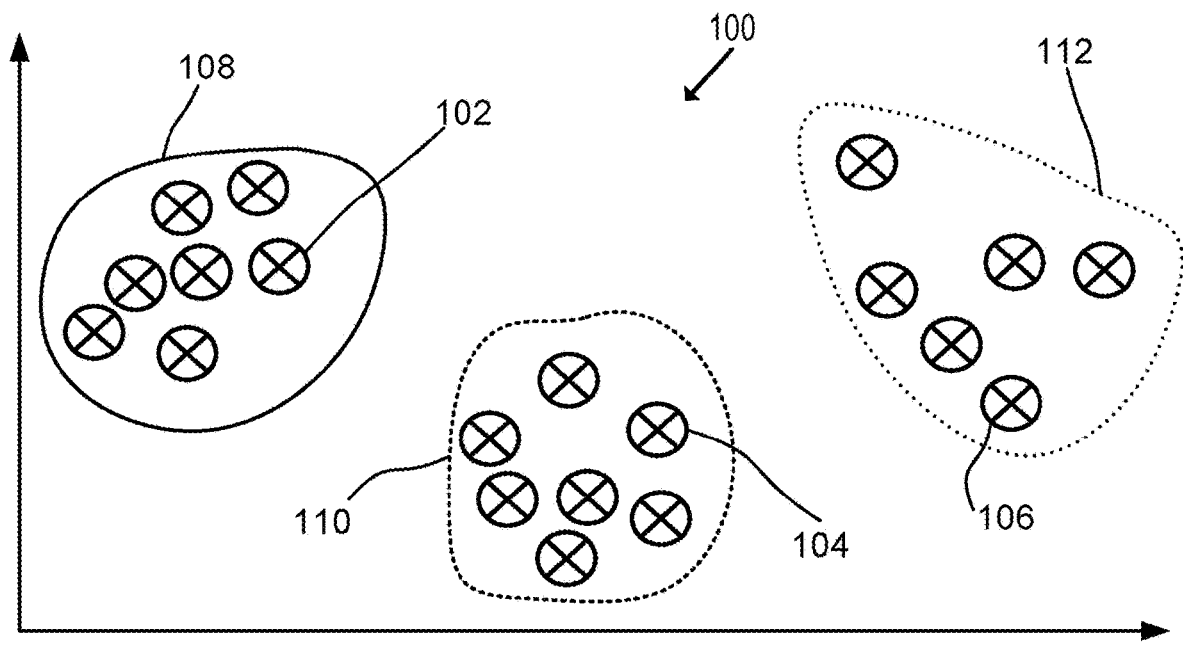
FIG. 1A depicts an example of k-means clustering.

Prior to discussing the details of some embodiments of the present disclosure, description of some terms may be helpful in understanding the various embodiments.

The term "server computer" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers, which may be coupled to one or more databases.

A "machine learning model" can refer to a set of software routines and parameters that can predict an output(s) of a real-world process (e.g., a diagnosis or treatment of a patient, identification of an attacker of a computer network, authentication of a computer, a suitable recommendation based on a user search query, etc.) based on a set of input features. A structure of the software routines (e.g., number of subroutines and relation between them) and/or the values of the parameters can be determined in a training process, which can use actual results of the real-world process that is being modeled.

The term "training computer" can refer to any computer that is used in training the machine learning model. As examples, a training computer can be one of a set of client computers from which the input data is obtained, or a server computer that is separate from the client computers.

The term "secret sharing" can refer to any one of various techniques that can be used to store a data item on a set of training computers such that each training computer cannot determine the value of the data item on its own. As examples, the secret sharing can involve splitting a data item up into shares that require a sufficient number (e.g., all) of training computers to reconstruct and/or encryption mechanisms where decryption requires collusion among the training computers.

DETAILED DESCRIPTION

Systems and techniques for privacy-preserving unsupervised learning are provided. The disclosed systems and techniques can enable separate computers, operated by separate entities, to perform unsupervised learning jointly based on a pool of their respective data, while preserving privacy. The system improves efficiency and scalability to large datasets while preserving privacy and avoids leaking a cluster identification. That is, the system can avoid revealing any information apart from the final output, in this case the clustering model.

In particular, each respective computer can maintain its own data set, while jointly performing unsupervised learning without revealing the contents of its data set to the other computers. The privacy-preserving joint learning may be based on a secure distance between data points of the pooled data set. The distance, in turn, may be computed based on a privacy-preserving joint multiplication.

The disclosed system and methods enable a pair of computing devices to compute jointly a secure distance via privacy-preserving multiplication of respective data values x and y from the computers based on a 1-out-of-N oblivious transfer (OT). In various embodiments, N may be 2, 4, or some other number of shares. In various embodiments, the system and methods disclosed herein can improve the computational cost of OT-based multiplication by a factor of 1.2 to 1.7. In an adaptive amortized setting, the disclosed system can realize further performance improvements, for example a 200-fold or 500-fold improvement. Moreover, the disclosed protocol may be more efficient than generic secure protocol (MPC and FHE), and can scale to very large datasets.

I. Unsupervised Learning

Embodiments of the disclosed systems and methods can use privacy-preserving joint multiplications to compute a secure distance (e.g., a Euclidean distance) for use with unsupervised learning. By contrast with supervised learning, unsupervised learning may involve machine learning (ML) when no training dataset is available.

Clustering is a type of unsupervised learning which involves grouping a set of objects into classes of similar objects. In particular, by clustering data elements into groups or clusters with similar data elements, an unsupervised learning system may discover patterns or similarities in the dataset, without needing to be trained on what types of patterns may be present. In some embodiments, the system may perform clustering methods of unsupervised learning, such as k-means clustering, or hierarchical clustering.

A. K-Means Clustering

FIG. 1A depicts an example of k-means clustering 100. In this example, data elements or points, such as data points 102, 104, and 106, may be clustered or grouped via k-means clustering 100 into clusters. In particular, points 102, 104, and 106 belong to clusters 108, 110, and 112, respectively.

In various embodiments, the data elements may include any type of information of relevance for an unsupervised learning process, such as account records or transaction histories, etc. In this example, the data elements may be represented as points or vectors in a multi-dimensional space. In particular, the coordinates or locations of a respective data point in the multi-dimensional space may represent the respective point's data values, for example, amounts or scored characteristics associated with historical transactions, etc. The data points' coordinates may quantify characteristics of the data. For example, in some embodiments, the closer the coordinate values of respective data points (or particular components of the points' coordinates), the more similar the data points may be.

In particular, the unsupervised learning process (e.g., k-means clustering 100) can operate based on a distance, such as a Euclidean distance, between the data points and their respective clusters. This distance may be a measure of similarity, i.e. the smaller the distance between two data points, the more similar the data points may be. In some embodiments, the system may use other measures of distance and/or other measures of similarity, and is not limited by the present disclosure.

The unsupervised learning process, such as k-means clustering 100, can optimize, or locally optimize, the clusters such that the data points best match their respective clusters. In some embodiments, the number k of clusters may be set, or user-specified, in advance. Alternatively, k may be optimized by the system, and is not limited by the present disclosure. In some embodiments, the system can optimize the number of clusters, the centroid locations of the clusters, and/or the composition of data points within each cluster, in order to achieve optimal clustering and learning. The computational complexity of k-means clustering may typically scale like O(nmt).

In some cases, it may be desirable for multiple parties to cluster a pooled dataset held by the parties. Moreover, the parties may wish to do so in a way that preserves privacy of their respective datasets, i.e. without revealing their datasets to each other. In particular, because the parties or entities are separate from each other (for example, separate companies or organization), they may wish to retain control over their own respective datasets without providing the data to each other.

Figure 1B:
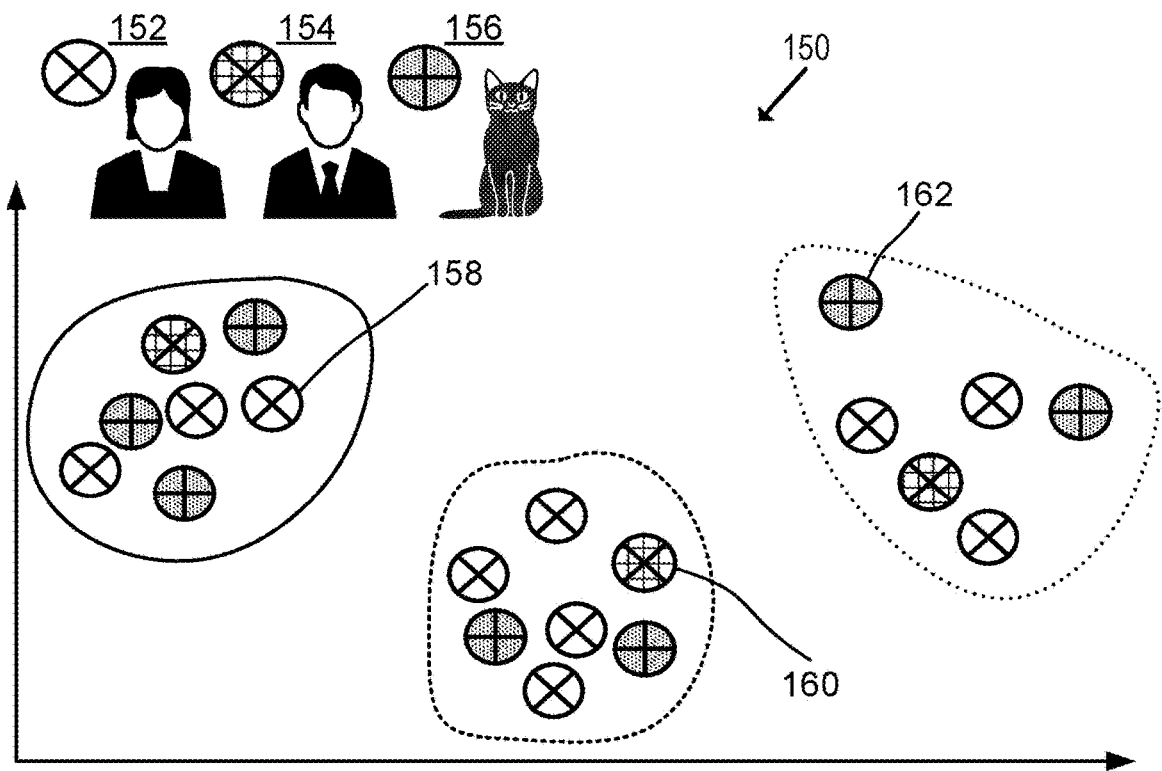
FIG. 1B depicts an example of privacy-preserving k-means clustering, according to an embodiment.

FIG. 1B depicts an example of privacy-preserving k-means clustering 150, according to an embodiment. In this example, multiple parties, Alice 152, Bob 154, and Cat 156, wish to cluster a pooled dataset in a privacy-preserving way. In this example, the three parties have their own datasets, each dataset containing its own data elements, as indicated by the hatching of the data points. For example, data point 158 may be part of Alice's dataset, data point 160 may be part of Bob's dataset, and data point 162 may be part of Cat's dataset.

In some embodiments, instead of having a subset of the data points, each party might have a portion of the data of each respective data point. For example, the parties may have separate shares (such as information associated with separate dimensions in the multi-dimensional space) of the respective data points.

II. Multiple-Server System for Privacy-Preserving Unsupervised Learning

In embodiments of the disclosed system and methods, datasets (such as transaction records) may be broken into shares possessed by two separate entities, such as two companies or organizations. The disclosed system and methods can enable separate computers, operated by separate entities, to perform unsupervised learning jointly based on a pool of their respective dataset shares, while preserving privacy. In particular, the disclosed protocol is more efficient than generic secure protocols, such as secure multi-party computation (MPC) and fully homomorphic encryption (FHE). It can also scale to very large datasets.

Figure 2:
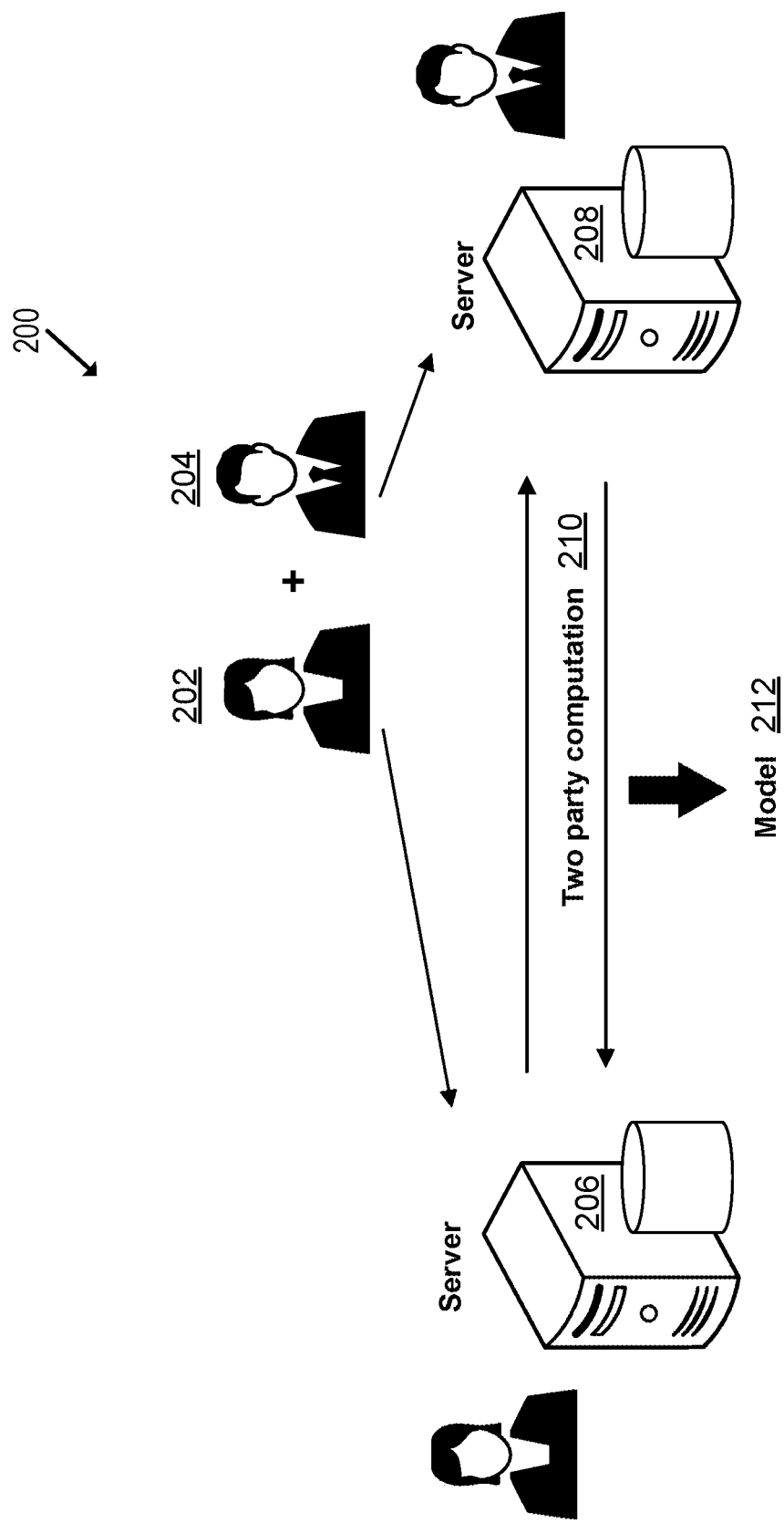
FIG. 2 depicts an example two-server model of privacy-preserving k-means clustering, according to an embodiment.

FIG. 2 depicts an example two-server model 200 of privacy-preserving k-means clustering, according to an embodiment. In this example, two entities, referred to as Alice 202 and Bob 204, may wish to perform unsupervised learning jointly, based on a pool of their data. Alice and Bob may further wish to safeguard the privacy of their respective datasets, i.e. to perform the unsupervised learning in a way that never actually assembles their respective datasets into a single data pool.

Accordingly, Alice may operate a computer, such as a server 206, and Bob may operate a computer, such as server 208. In an embodiment, servers 206 and 208 can communicate directly with each other, in order to engage in a joint two-party computation 210.

Two-party computation 210 may include privacy-preserving joint multiplication, joint secure distance, and/or privacy-preserving joint unsupervised learning computations, according to the methods disclosed herein below. Two-party computation 210 can output model 212, such as optimized, or locally optimized, cluster assignments.

In particular, servers 206 and 208 may communicate directly, because Alice and Bob may not wish to assemble a pooled dataset on any one computer, such as an intermediary computer. As a result, Alice and Bob may instead perform two-party computation 210 in a way such that the output model 212 is determined without the pooled dataset ever being assembled, according to the methods disclosed herein.

Moreover, the disclosed methods may have advantages, such as efficiency and scaling advantages, compared with other methods.

For clarity, a certain number of components are shown in FIG. 2. It is understood, however, that embodiments of the disclosure may include more than one of each component. In addition, some embodiments of the disclosure may include fewer than or greater than all of the components shown in FIG. 2. In addition, the components in FIG. 2 may communicate via any suitable communication medium (including the internet), using any suitable communication protocol.

III. Techniques for Privacy-Preserving Computing

Various embodiments can use various secure computation techniques. Such techniques can be used to perform a function on data that is secret-shared across the servers, without exposing the reconstructed data to a server. For example, in various embodiments, the system may use oblivious transfer (OT), garbled circuits, and secret sharing, which are briefly described herein. In some embodiments, the system may use variations of these techniques, as well as other techniques, and is not limited by the present disclosure. How such techniques are combined and used in the overall unsupervised learning process will be described in later sections.

A. Oblivious Transfer

Oblivious transfer (OT) is a fundamental cryptographic primitive that is commonly used as building block in secure multiparty computation (MPC). In an oblivious transfer protocol, a sender S has two inputs $x_0$ and $x_1$, and a receiver R has a selection bit b and wants to obtain $x_b$ without learning anything else or revealing b to S. The ideal functionality realized by such a protocol can be defined as: on input (SELECT; sid; b) from R and (SEND; sid; x0; x1) from S, return (RECV; sid; xb) to R. We use the notation $(\perp;x_b) \leftarrow OT(x_0,x_1;b)$ to denote a protocol realizing this functionality.

Figure 3:
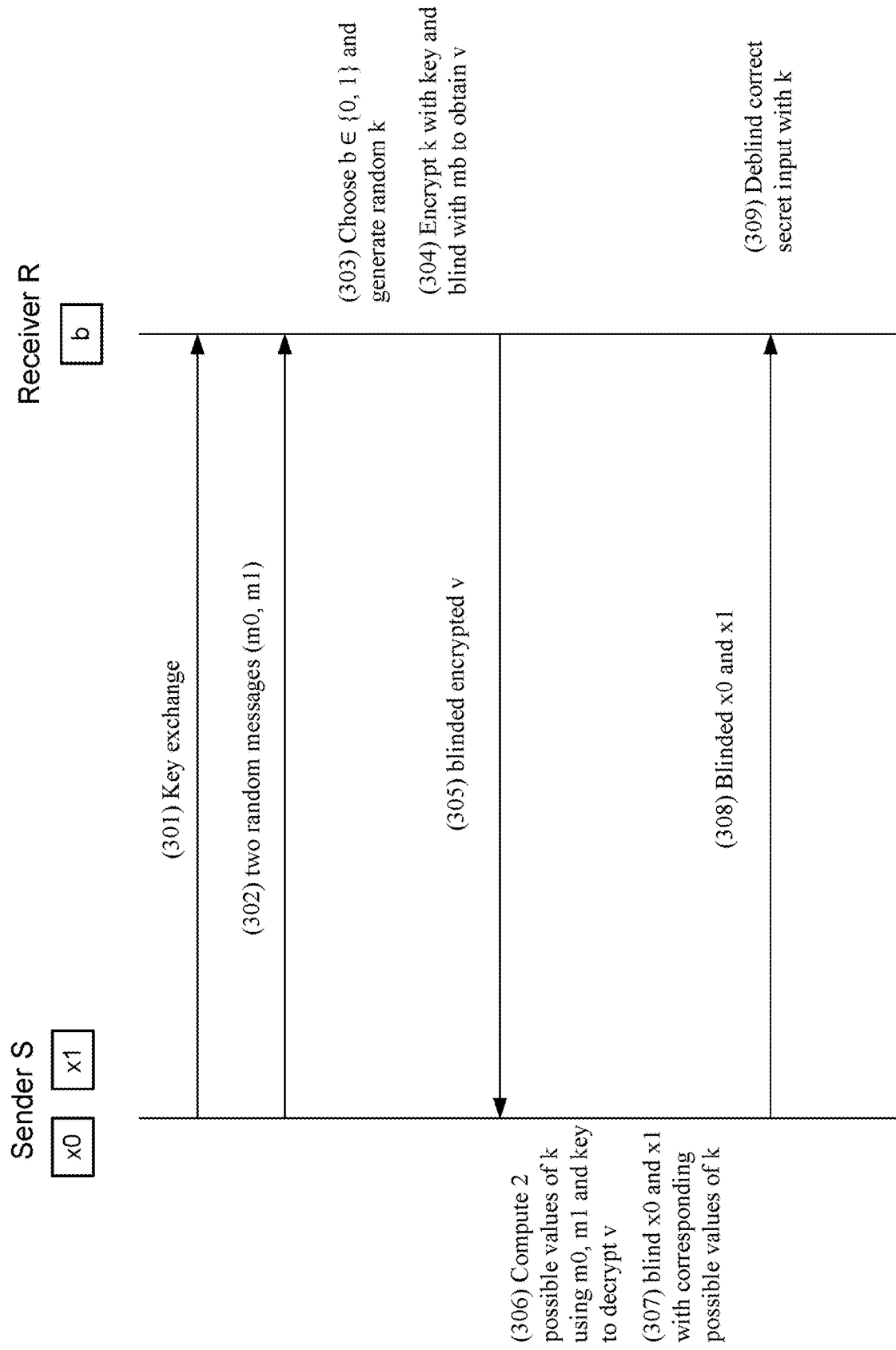
FIG. 3 depicts an example of oblivious transfer.

FIG. 3 depicts an example of oblivious transfer. At 301, sender S performs a key exchange with receiver R. For example, sender S can generate a private/public key pair and send the public key (e.g., modulus N and exponent e) to receiver R. At 302, sender S generates two random values, m0 and m1, and sends them to receiver R. At 303, receiver R chooses b to be 0 or 1, thereby selecting mb. Receiver R also generates a random number k. At 304, receiver R encrypts the random number k with the key exchanged from sender S, and uses mb to blind the result, thereby obtaining blinded and encrypted v. At 305, receiver R sends the blinded encrypted v to sender S.

At 306, sender S attempts to deblind and decrypt v by applying m0 and m1 and its key to v to derive two possible values for k, one of which will equal the random value generated by receiver R. Sender S does not know (and hopefully cannot determine) which of m0 and m1 that receiver R chose. At 307, x0 and x1 are blinded with the two possible values of k. At 308, the blinded x0 and x1 are sent to receiver R, each can be identified as corresponding to 0 or 1. At 309, receiver R deblinds the blinded value corresponding to the selected b using k.

Accordingly, oblivious transfer can function by sender S generating two keys, m0 and m1. Receiver R can then encrypt a blinding factor using one of the keys. Sender S then decrypts the blinding factor using both of the keys, where one is the correct blinding factor, which is used to blind both the secret inputs. Receiver R can then deblind the correct input.

Embodiments can use OTs both as part of an offline protocol for generating multiplication triplets and in an online phase for logistic regression and neural network training in order to securely compute the activation functions. One-round OT can be implemented, but it requires public-key operations by both parties. OT extension minimizes this cost by allowing the sender and receiver to perform m OTs at the cost of λ base OTs (with public-key operations) and O(m) fast symmetric-key ones, where λ is the security parameter. Some implementations can takes advantage of OT extension for better efficiency. In one embodiment, a special flavor of OT extension called correlated OT extension is used. In this variant which we denote as COT, the sender's two inputs to each OT are not independent. Instead, the two inputs to each OT instance are: a random value so and a value $s_1 = f(s_0)$ for a correlation function $f$ of the sender's choice. The communication for a COT of 1-bit message, denoted by $COT_l$, is λ+l, and the computation is hashing, e.g., SHA256, SHA3, or other cryptographic hashing.

B. Garbled Circuit 2PC

A garbling scheme consists of a garbling algorithm that takes a random seed σ and a function $f$ and generates a garbled circuit F and a decoding table dec; the encoding algorithm takes input x and the seed σ and generates garbled input x the evaluation algorithm takes x and F as input and returns the garbled output z; and finally, a decoding algorithm that takes the decoding table dec and z, and returns $f(x)$. Some embodiments can have the garbling scheme satisfy standard security properties.

The garbled circuit can be viewed as a Boolean circuit, with inputs in binary of fixed length. A Boolean circuit is a collection of gates connected with three different types of wires: circuit-input wires, circuit-output wires and intermediate wires. Each gate receives two input wires (e.g., one for each party) and it has a single output wire which might be fan-out (i.e. be passed to multiple gates at the next level). Evaluation of the circuit can be done by evaluating each gate in turn. A gate can be represented as a truth table that assigns a unique output bit for each pair of input bits.

The general idea of garbled circuits is that the original circuit of a function is transformed so that the wires only contain random bitstrings. For example, every bit in a truth table is replaced by one of two random numbers (encodings), with the mapping known by the sender. Each gate is encoded so that its output bitstring can be computed from the inputs, and only the random bitstrings of output gates can be mapped back to actual results. The evaluation computes the function, but does not leak information about the values on separate wires. The main drawback of the garbled circuit technique are inefficient evaluation and inability to reuse the circuit. Accordingly, the two parties (sender and receiver) can learn the output of the circuit based on their own input and nothing else, i.e., not learn the other party's input to the circuit.

In some implementations, the sender prepares the garbled circuit by determining a truth table for each gate using the random numbers that replaced the two bits on the input wires. The output values are then encrypted (e.g., using double-key symmetric encryption) with the random numbers from the truth table. Thus, one can only decrypt the gate only if one knows the two correct random numbers for a given output value. The four values for a given table can be randomly permuted (garbled), so there is no relation of row to the output value. The sender can send the garbled tables (sets of encrypted values and the relation between them, i.e., outputs from one to be inputs to another) to the receiver, as well as the sender's input of random values corresponding to the input bits. The receiver can obtain the corresponding random numbers from the sender via oblivious transfer, and thus the sender does not know the receiver's input. The receiver can then compute the output, or potentially get an encoding that needs to be sent back to the sender for decoding. The encoding can be sent to the sender if you want the sender to learn the output. This may not be done for intermediate values of the computation, and may only be done for a final output, which the parties are supposed to learn anyways. If a party is not supposed to learn the output, the encoding does not need to be sent. In some embodiments, the garbled circuits work on intermediate values (e.g., comparison function), so they may not be decoded.

Given such a garbling scheme, it is possible to design a secure two-party computation protocol as follows: Alice generates a random seed σ and runs the garbling algorithm for function $f$ to obtain a garbled circuit GC. She also encodes her input x using σ and x as inputs to the encoding algorithm. Alice sends GC and x to Bob. Bob obtains his encoded (garbled) input y using an oblivious transfer for each bit of y. While an OT-based encoding is not a required property of a garbling scheme, all existing constructions permit such interacting encodings. Bob then runs the evaluation algorithm on GC,x, y to obtain the garbled output z. We can have Alice, Bob, or both learn an output by communicating the decoding table accordingly. The above protocol securely realizes the ideal functionality $F_f$ that simply takes the parties inputs and computes $f$ on them. In this disclosure, we denote this garbled circuit 2PC by $(z_a, z_b) \leftarrow$ GarbledCircuit(x;y,$f$).

C. Secret Sharing and Multiplication Triplets

As described above, values are secret-shared between the two servers. In various embodiments, three different sharing schemes can be employed: Additive or arithmetic sharing, Boolean sharing and Yao sharing. In some embodiments, all intermediate values are secret-shared between the two servers.

To additively share a $\ell$-bit value $a \in \mathbb{Z}_{2^\ell}$, the party with a (say Alice) generates $a^A \in \mathbb{Z}_{2^\ell}$ uniformly at random and sends $a^B = a - a^A \in \mathbb{Z}_{2^\ell}$ to the other party (Bob). We denote Alice's share by $a^A$ and the Bob's by $a^B$. For ease of composition, we omit the modular operation in the protocol descriptions, i.e. $a^B = a - a^A \mod 2^\ell$. This disclosure mostly uses the additive sharing in the examples, but other sharing techniques may be used. To reconstruct an additively shared value $(a^A, a^B)$, the party who should learn the value receives the second share from the other party. For example, for Alice to learn a then Bob would send $a^B$ to Alice who computes $a = a^A + a^B \in \mathbb{Z}_{2^\ell}$.

Given two shared value of a and b, it is easy to non-interactively add the shares by having each party compute $c^A = a^A + b^A$, $c^B = a^B + b^B$. It is easy to see that $c = a + b = c^A + c^B$.

Boolean sharing of a bit $a \in \mathbb{Z}_2$ can be seen as additive sharing in $\mathbb{Z}_2$ and hence all the protocols discussed above carry over. In particular, the addition operation is replaced by the XOR operation ($\oplus$) and multiplication (to be described) is replaced by the AND operations (AND(•,•)).

In the case that $a \in \mathbb{Z}_{2^\ell}$ is an $\ell$-bit value, the binary sharing of a can be extended by sharing the vector $a_0, \ldots, a_{\ell-1} \in \mathbb{Z}_2$ such that $a = \sum_{i=0}^{\ell-1} a_i 2^i \in \mathbb{Z}_{2^\ell}$. We will refer to $(a_0, \ldots, a_{\ell-1}) \in \mathbb{Z}_2^\ell$ as the binary decomposition of $a \in \mathbb{Z}_{2^\ell}$. More generally, an N-ary or base-N decomposition of $a \in \mathbb{Z}_{2^\ell}$ is defined by $(a_0, \ldots, a_{\ell'-1}) \in \mathbb{Z}_N^{\ell'}$ such that $a = \sum_{i=0}^{\ell'-1} a_i N^i \in \mathbb{Z}_{2^\ell}$ and where $\ell' = \lceil \log_N(2^\ell) \rceil$.

Finally, one can also think of a garbled circuit protocol as operating on Yao sharing of inputs to produce Yao sharing of outputs. In particular, in all garbling schemes, for each wire w the garbler ($P_0$) generates two random strings $k_0^w$, $k_1^w$. When using the point-and-permute technique, the garbler also generates a random permutation bit $r_w$ and lets $K_0^w = k_0^w \| r_w$ and $K_1^w = k_1^w \| (1 - r_w)$. The concatenated bits are then used to permute the rows of each garbled truth table. A Yao sharing of a is $\langle a \rangle_0^Y = K_0^w$ and $\langle a \rangle_1^Y = K_a^w$. To reconstruct the shared value, parties exchange their shares. XOR and AND operations can be performed by garbling/evaluating corresponding gates.

To switch from a Yao sharing $\langle a \rangle_0^Y = K_0^w$, $K_1^w$ and $\langle a \rangle_1^Y = K_a^w$ to a Boolean sharing, $P_0$ lets $\langle a \rangle_0^B = K_0^w[0]$ and $P_1$ lets $\langle a \rangle_1^B = \langle a \rangle_1^Y[0]$. In other words, the permutation bits used in the garbling scheme can be used to switch to Boolean sharing for free. We denote this Yao to Boolean conversion by Y2B(•,•).

IV. Privacy-Preserving Unsupervised Learning

A. Euclidean Distance

In a typical embodiment, the distance may be a Euclidean distance.

Figure 4A:
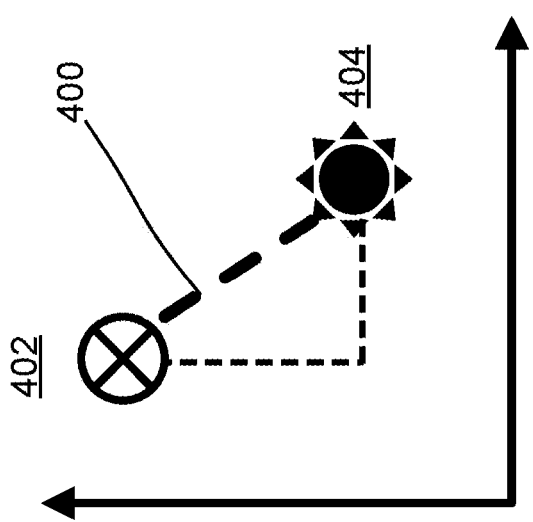
FIG. 4A depicts an example of Euclidean distance.

FIG. 4A depicts an example of Euclidean distance 400. In this example, Euclidean distance 400 corresponds to the distance between a point 402, such as a data point or element to be clustered, and a second point 404. In a typical embodiment, point 404 may be a cluster centroid, such as a mean or median position of the coordinates of data points already associated with a particular cluster, or some other measure of the cluster's center.

The Euclidean distance, such as distance 400, may be given by an d-dimensional distance formula, such as in standard Euclidean geometry: $D_{Euc}(p, c) = \sum_{i=1}^{d}(p_i - c_i)^2$, where $D_{Euc}$ is the square of the Euclidean distance, and the data elements $p \in \mathbb{Z}_{2^\ell}^d$ and clusters $c \in \mathbb{Z}_{2^\ell}^d$ are d-dimensional vectors with elements in $\mathbb{Z}_{2^\ell}$. In this formula, p and c are fixed to a particular data point and cluster, respectively, and the index i indexes a coordinate or component the d-dimensional vector space.

Note that, in some embodiments, the secure distance may be another distance function or metric, for example some other function of the coordinates of points 402 and 404, and is not limited by the present disclosure.

Figure 4B:
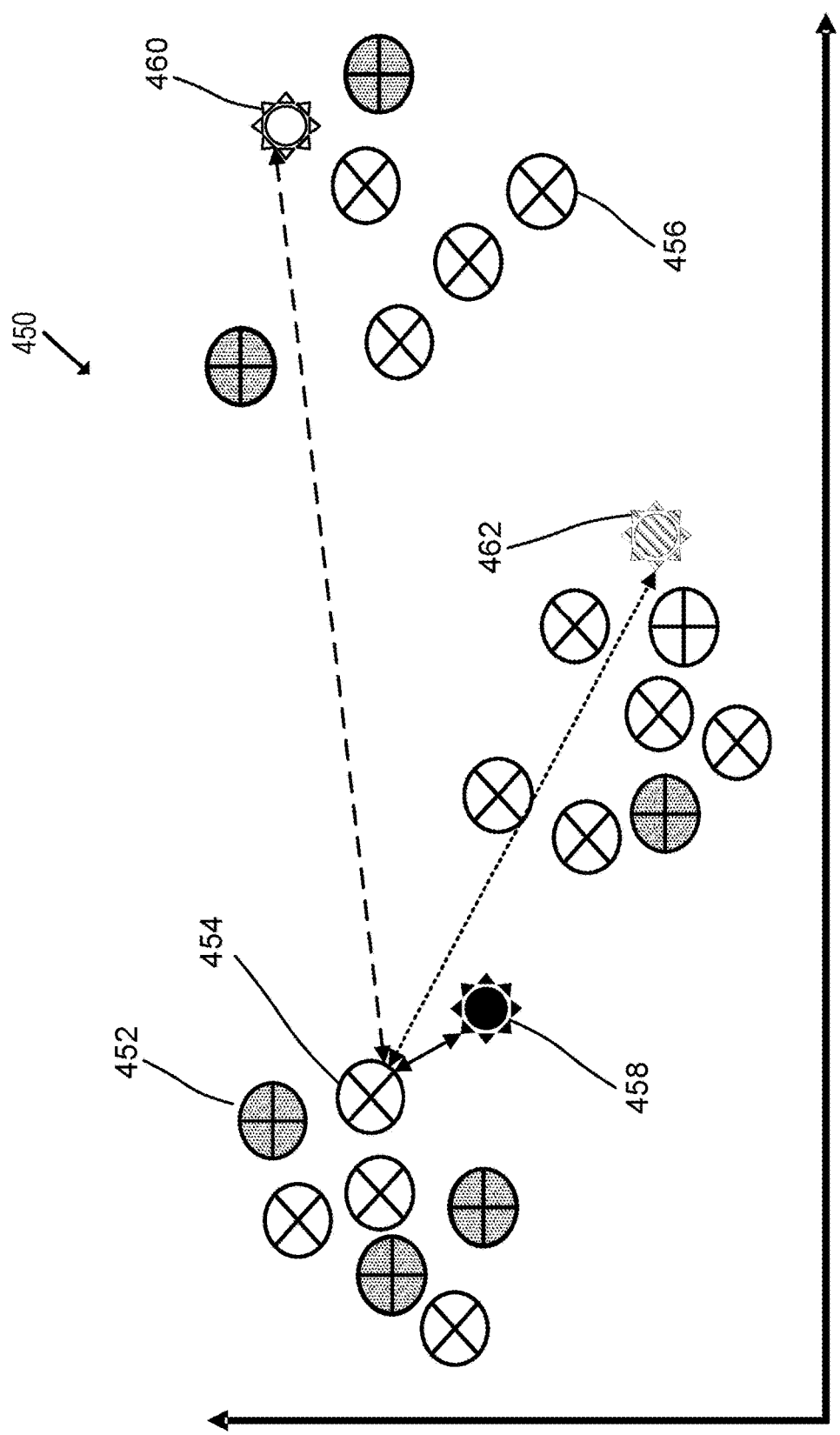
FIG. 4B depicts an example of k-means clustering based on Euclidean distance, according to embodiments.

FIG. 4B depicts an example of k-means clustering 450 based on a distance, such as a Euclidean distance, according to embodiments. In some embodiments, the system computes the Euclidean distance from all the data points, such as data points 452, 454, and 456, to each cluster center, such as cluster centers 458, 460, and 462. For example, the system can compute the distance from data point 454 to the three clusters with centers 458, 460, and 462. Because data point 454 has a shorter Euclidean distance to cluster center 458 than to centers 460 or 462, point 454 may be assigned to the cluster with center 458.

Furthermore, the location of cluster center 458 may be recomputed to include point 454, which in this example may be newly-added to the cluster. For example, if cluster center 458 is a centroid, such as a mean location of all the data points assigned to the cluster, the centroid location can then be recomputed. For example, centroid location 458 may be recomputed by computing a new mean location of all the data points, including newly-added point 454.

B. Secure Euclidean Distance

However, as described in the examples of FIGS. 1B and 2 above, it may be desirable to perform unsupervised learning on a pooled dataset held by two or more parties, such as in the two-party model of FIG. 2. Moreover, consider that the two parties, Alice and Bob, may each hold their own arithmetic shares of the respective data points $p_i$ and cluster locations $c_j$: $p_i = p_i^A + p_i^B$, $c_j = c_i^A + c_i^B$ for $i \in \{1, \ldots, d\}$. For example, Alice and Bob may hold separate information (such as information associated with separate dimensions in the multi-dimensional space) about a single respective data point $p_i$ or cluster centroid $c_j$. In such a case, neither Alice nor Bob alone can perform the distance calculation between $p_i$ and $c_j$. Instead, Alice and Bob may wish to compute the secure distance in a way that preserves privacy of their respective datasets, i.e. without revealing their datasets to each other.

Thus, computing the secure distance may involve secure or privacy-preserving multiplication of Alice's and Bob's respective shares. In particular, we can break down the expression for $D_{Euc}$ into separate parts for Alice and Bob, plus a joint part: $D_{Euc}(p, c) = \sum_{i=1}^{d}(p_i^A + p_i^B - c_i^A - c_i^B)^2 = \sum_{i=1}^{d}((p_i^A - c_i^A) + (p_i^B - c_i^B))^2$. Alice can locally compute $\sum_{i=1}^{d}(p_i^A - c_i^A)^2$, while Bob can locally compute $\sum_{i=1}^{d}(p_i^B - c_i^B)^2$. Thus, it remains for Alice and Bob to jointly compute the cross term or inner product $\sum_{i=1}^{d}(p_i^A - c_i^A)(p_i^B - c_i^B)$, while preserving privacy. Embodiments of the disclosed system and methods can solve this problem by conducting privacy-preserving joint multiplication more efficiently than existing systems. Specifically, the privacy-preserving joint multiplication disclosed herein below may be used to compute the cross term, $\sum_{i=1}^{d}(p_i^A - c_i^A)(p_i^B - c_i^B)$.

1. Secure Multiplication with 1-Out-of-2 OT

Figure 5A:
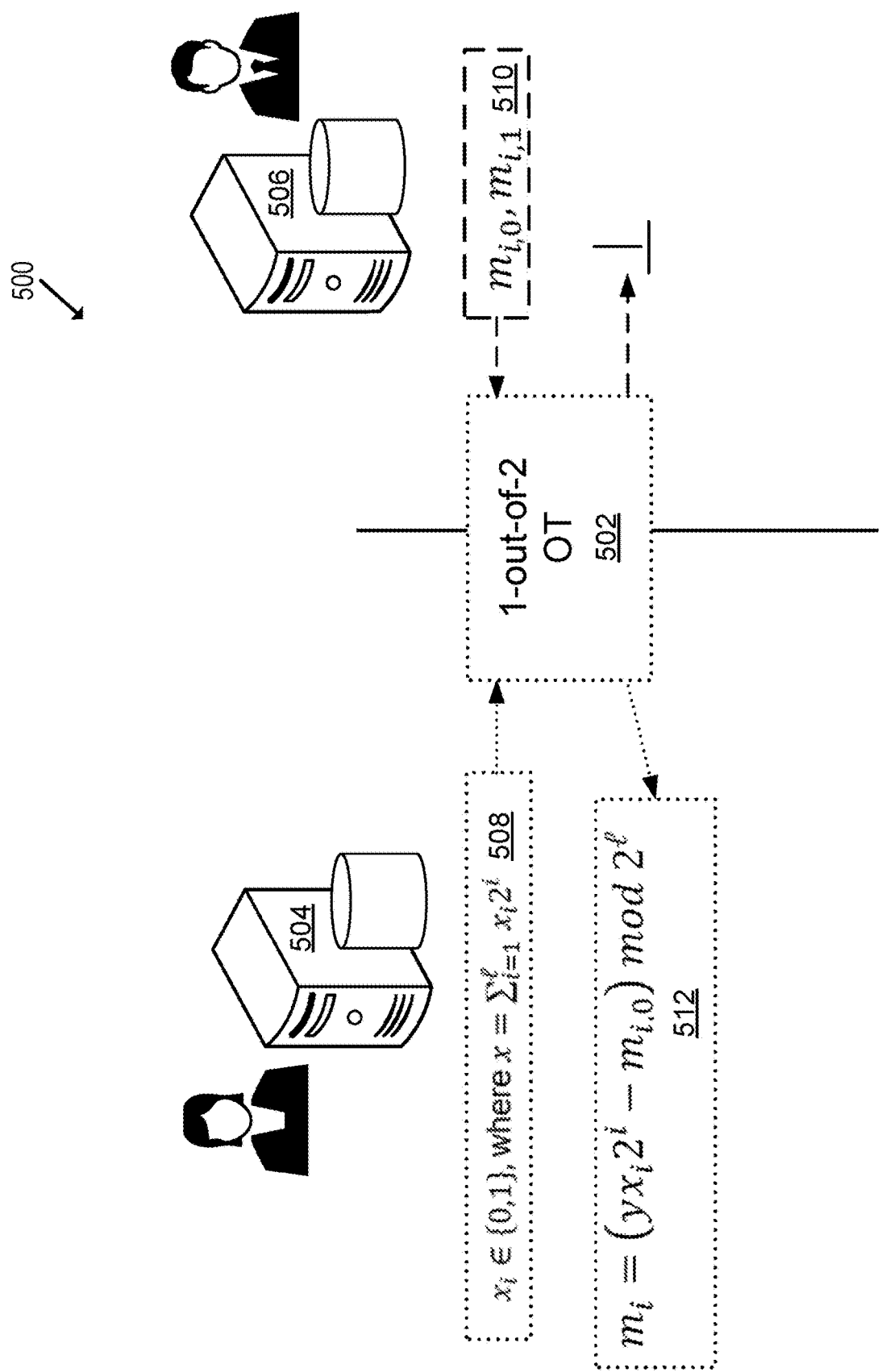
FIG. 5A depicts computing secure Euclidean distance based on 1-out-of-2 Oblivious Transfer for privacy-preserving unsupervised learning, according to an embodiment.

FIG. 5A depicts computing 500 secure Euclidean distance based on 1-out-of-2 Oblivious Transfer (OT) 502 for privacy-preserving unsupervised learning, according to an embodiment.

In this example, the first computer 504 is operated by Alice, and the second computer 506 by Bob. Alice will hold some integer element $x \in \mathbb{Z}_{2^\ell}$ and Bob will hold $y \in \mathbb{Z}_{2^\ell}$. They will compute a secret sharing of $z = xy$ such that Alice holds a uniformly random $z^A \in \mathbb{Z}_{2^\ell}$ and Bob holds $z^B \in \mathbb{Z}_{2^\ell}$ such that $z = z^A + z^B$. First Alice can express this data value x in binary as a vector 508. In an embodiment, $x_i$ may contain Alice's share of the input to a cross term, $x = p_i^A - c_i^A$ and $y = p_i^B - c_i^B$.

Generally, the disclosed method may work by expressing Alice's data value x as its binary decomposition $(x_0, \ldots, x_{\ell-1}) \in \mathbb{Z}_2^\ell$ and then using the individual bits $x_i$ to select messages from Bob in the OT 502. Intuitively, if $x_i = 0$, then $(yx_i) = 0$, so it is not necessary to receive information about y from Bob. If $x_i = 1$, Bob's message containing information about y is selected, and Alice receives information about $(yx_i) = y$. It then holds that $z = \sum_{i=0}^{\ell-1}(x_i y) 2^i$ is the desired value. However, this procedure would reveal Bob's input y to Alice. Privacy is achieved by transmitting a random integer $r_i \in \mathbb{Z}_{2^\ell}$ when $x_i = 0$ (instead of zero) and $y + r_i$ when $x_i = 1$. Therefore Alice can compute $z^A = \sum_{i=0}^{\ell-1}(x_i(y + r_i)) 2^i \in \mathbb{Z}_{2^\ell}$ and Bob computes $z^B = -\sum_{i=0}^{\ell-1} r_i 2^i \in \mathbb{Z}_{2^\ell}$. As a result, OT 502 is used to perform the equivalent of the multiplication while preserving privacy.

In some embodiments, the system can instead perform privacy-preserving multiplication based on 1-out-of-N OT, for a value of N besides 2. This can be accomplished by modifying Alice's and Bob's messages in the OT compared to the case of 1-out-of-2 OT, as in FIG. 5A. Specifically, Alice's message may be modified by expressing x in base-N rather than binary. Bob's message may be modified to an k×N matrix, rather than two k'-component vectors (or equivalently, an k'×2 matrix). These modifications are described in more detail herein. Accordingly, one can pose the question: what is the optimal value of N, for example from a computational efficiency perspective? In particular, in some embodiments, the system may make use of more efficient protocols for 1-out-of-N OT compared to N=2, and/or may make use of methods for performing OT that depend on the number k of bits. In some embodiments, N=4 (i.e., privacy-preserving multiplication based on 1-out-of-4 OT) may have a lower communication cost than N=2, N=8, N=16, or N=256. However, in various embodiments, the system may use any value of N, and is not limited by the present disclosure.

2. Secure Multiplication with 1-Out-of-N OT

Figure 5B:
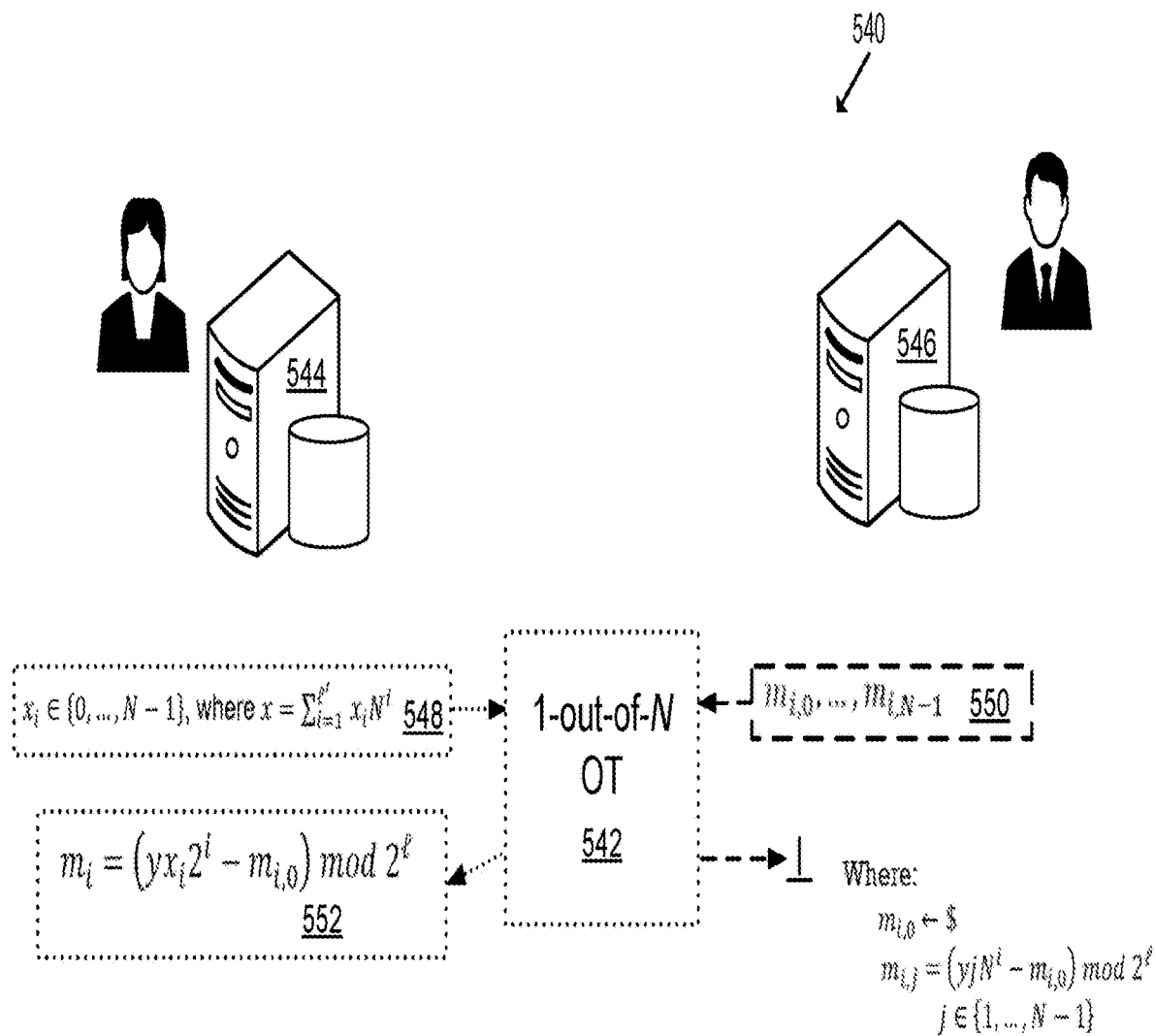
FIG. 5B depicts computing secure Euclidean distance based on 1-out-of-N Oblivious Transfer for privacy-preserving unsupervised learning, according to an embodiment.

FIG. 5B depicts computing 540 secure Euclidean distance based on 1-out-of-N Oblivious Transfer 542 for privacy-preserving unsupervised learning, according to an embodiment.

In this example, the first computer 544 is operated by Alice, and the second computer 546 by Bob. Alice will hold some integer element $x \in \mathbb{Z}_{2^\ell}$ and Bob will hold $y \in \mathbb{Z}_{2^\ell}$. They will compute a secret sharing of $z = xy$ such that Alice holds a uniformly random $z^A \in \mathbb{Z}_{2^\ell}$ and Bob holds $z^B \in \mathbb{Z}_{2^\ell}$ such that $z = z^A + z^B$. The first computer 544 can have a data value $x \in \mathbb{Z}_{2^\ell}$ that is held by Alice is expressed in base-N. Specifically, x may be expressed 548 as $(x_0, \ldots, x_{\ell'-1}) \in \mathbb{Z}_N^{\ell'}$ which is the N-ary decomposition of x such that $x = \sum_{i=0}^{\ell'-1} x_i N^i \in \mathbb{Z}_{2^\ell}$.

The second computer 546 operated by Bob has a data value $y \in \mathbb{Z}_{2^\ell}$. The second computer 546 can form an $\ell' \times N$ matrix 550 based on y. Let M be matrix 550 where $M_{i,j} = jy + r_i \in \mathbb{Z}_{2^\ell}$ and $r_i \in \mathbb{Z}_{2^\ell}$ is a uniformly random integer for $i \in \{0, 1, \ldots, \ell'-1\}$ and $j \in \{0, 1, \ldots, N-1\}$. In an embodiment $r_i$ may be sampled by the OT protocol and therefore $M_{i,0} = r_i$ may not need to be explicitly communicated.

The first computer 544 can receive an output vector 552 from the OT. According to the OT, as described in the example of FIG. 3 above, Alice's input $x_i$ may function as a selection or choice flag, which selects Bob's input $M_{i,x_i} = x_i y + r_i$. The final sharing of $z = xy$ are then computed as $z^A = \sum_{i=0}^{\ell'-1} M_{i,x_i} N^i \in \mathbb{Z}_{2^\ell}$ and $z^B = -\sum_{i=0}^{\ell'-1} M_{i,0} N^i \in \mathbb{Z}_{2^\ell}$ by the respective computers where $z = z^A + z^B \in \mathbb{Z}_{2^\ell}$. Correctness follows from, $\sum_{i=0}^{\ell'-1} M_{i,x_i} N^i - M_{i,0} N^i = \sum_{i=0}^{\ell'-1} (x_i y + r_i) N^i - r_i N^i = x_i y N^i = z$. Note that, in an embodiment where N=2, these expressions reduce to the equivalent expressions for the 1-out-of-2 OT case, as in FIG. 5A above.

Based on some embodiments of the OT, each OT will require approximately κ=128 bits of communication plus $\ell(N-1)$ bits, where κ is the security parameter. This follows from 1-out-of-N OT for random messages requiring κ bits of communication. Setting the remaining messages $M_{i,1}, \ldots, M_{i,N-1}$ to the desired value then requires $\ell(N-1)$ bits of communication. Given that the multiplication protocol requires $\ell' = \lceil \log N(2^\ell) \rceil$ OTs the total communication is $t = \lceil \log N(2^\ell) \rceil (\kappa + \ell(N-1))$. Based on the required $\ell$ we choose $N \in \{2, 3, 4, \ldots\}$ to minimize t.

In various embodiments, the system and methods disclosed herein can improve the computational cost of OT-based multiplication by a factor of 1.2 to 1.7. In an amortized setting, the disclosed system can realize further performance improvements, as described below.

A straightforward application of secure multiplication, as described in the examples of FIGS. 5A and 5B above, may require a total of n secure multiplications to compute the distance, which must be summed over the d-dimensional space of the data elements. In turn, each secure multiplication requires $\ell'$ instances of OT for the $\ell'$ digits in the N-ary decomposition (FIG. 5B) of Alice's data value x. Each iteration of k-means clustering requires a matrix of distances $[e_{ik}]$ to be computed between each data point $p_i$ out of a total of n data points, and each cluster centroid $c_k$, from a total of m clusters. Assuming the k-means clustering process runs for a total of T iterations, the total communication cost for computing the Euclidean distance therefore includes Tdnm* $\ell'(\kappa+\ell(N-1))$ bits.

3. Amortized Secure Multiplication

In some embodiments, the system may improve efficiency by applying secure multiplication in an amortized setting. Consider some fixed value $x \in \mathbb{Z}_{2^\ell}$ known to Alice and a series of many $y_1, \ldots, y_{m'} \in \mathbb{Z}_{2^\ell}$ known to Bob. For each new $y_i$, the parties desire to compute a sharing of $z_q = xy_q$. The $y_i$ values may be known to Bob at different times, e.g. a different subset of them at each iteration of the algorithm. The generic method is to repeat a previous multiplication protocol for each of the m' multiplications.

Instead, the parties may first perform a random OT where Alice uses the N-ary decomposition of x denoted as $(x_0, \ldots, x_{\ell'-1}) \in \mathbb{Z}_N^{\ell'}$ to learn the corresponding random OT value/key. Specifically, let $R \in \mathbb{Z}_{2^\kappa}^{\ell' \times N}$ random messages/keys output by the OTs where Alice learns $R_{i,x_i} \in \mathbb{Z}_{2^\kappa}$. For each $y_i$, the random OT messages can be used to encrypt the corresponding value of $M_{q,i,j} = jy_q + r_{q,i} \in \mathbb{Z}_{2^\ell}$ such that Alice can only recover $M_{q,i,x_i}$. For example, let PRF: $\{0,1\}^* \to \mathbb{Z}_{2^\ell}$ denote a cryptographic pseudorandom function. Bob could send $E_{q,i,j} = \text{PRF}(R_{i,j}\|q) + M_{q,i,j}$ for $\forall q, i, j$ and Alice would recover $M_{q,i,x_i} = E_{q,i,x_i} - \text{PRF}(R_{i,x_i}\|q) = x_i y_q + r_{q,i}$. From $M_{q,i,x_i}$ Alice and Bob can compute their respective output share as $z_q^A = \sum_{i=0}^{\ell'-1} M_{q,i,x_i} N^i \in \mathbb{Z}_{2^\ell}$ and $z_q^B = -\sum_{i=0}^{\ell'-1} M_{q,i,0} N^i \in \mathbb{Z}_{2^\ell}$. Since the number of OTs is independent of m', the communication per $y_i$ reduces to $$\ell'\left(\frac{\kappa}{m'} + \ell(N-1)\right).$$

4. Amortized Euclidean Squared Distance

Over the course of the training process the training points $p_1, \ldots, p_n \in \mathbb{Z}_{2^\ell}^d$ are fixed and secret shared between Alice and Bob. The secret shared centroids $c_1, \ldots, c_m \in \mathbb{Z}_{2^\ell}^d$ are set to some initial value and then updated at each iteration of the algorithm. Let $c_{j,t} \in \mathbb{Z}_{2^\ell}^d$ be the value of the jth centroid at iteration t. At each iteration t the squared Euclidean distance $e_{i,j,t}$ between $p_i$ and $c_{j,t}$ for $i \in [n]$, $j \in [m]$ is computed. Previously, $e_{i,j,t}$ was expressed as $e_{i,j,t} = \sum_{h=1}^{d}(p_{i,h} - c_{j,t,h})^2 = \sum_{h=1}^{d}((p_{i,h}^A + p_{i,h}^B) - (c_{j,t,h}^A + c_{j,t,h}^B))^2$.

Recall that only the mixed terms need to be computed using the secure multiplication protocol, i.e. $(p_{i,h}^A \cdot c_{j,t,h}^A)$ $(p_{i,h}^B \cdot c_{j,t,h}^B)$. In the amortized setting it can be beneficial to rewrite this as $p_{i,h}^A(p_{i,h}^B + c_{j,t,h}^B) - p_{i,h}^B(c_{j,t,h}^A) + c_{j,t,h}^A c_{j,t,h}^B$. Observe that $p_{i,h}^A$ in the first term and $p_{i,h}^B$ is the second term are fixed across all $t \in [T]$ iterations and therefore can efficiently be computed using the amortized multiplication protocol, i.e. we define $p_{i,h}^A$, and $p_{i,h}^B$, as the fixed multiplicand and $(p_{i,h}^B + c_{j,t,h}^B)$, and $c_{j,t,h}^A$, as the changing multiplicand for $t \in [T]$.

Finally, the $c_{j,t,h}^A c_{j,t,h}^B$, term is contained in all n Euclidean distance computation at iteration t and they can be computed once at each iteration. Note that the number of centroids is typically much smaller than the number of training points, i.e. n>>m. The total overhead is therefore Tmd standard multiplication (to compute $c_{j,t,h}^A c_{j,t,h}^B$) and 2Tnmd amortized multiplications. By contrast, the generic approach would require Tnmd standard multiplications, which for some parameter choices results in high computational overhead.

Figure 5C:
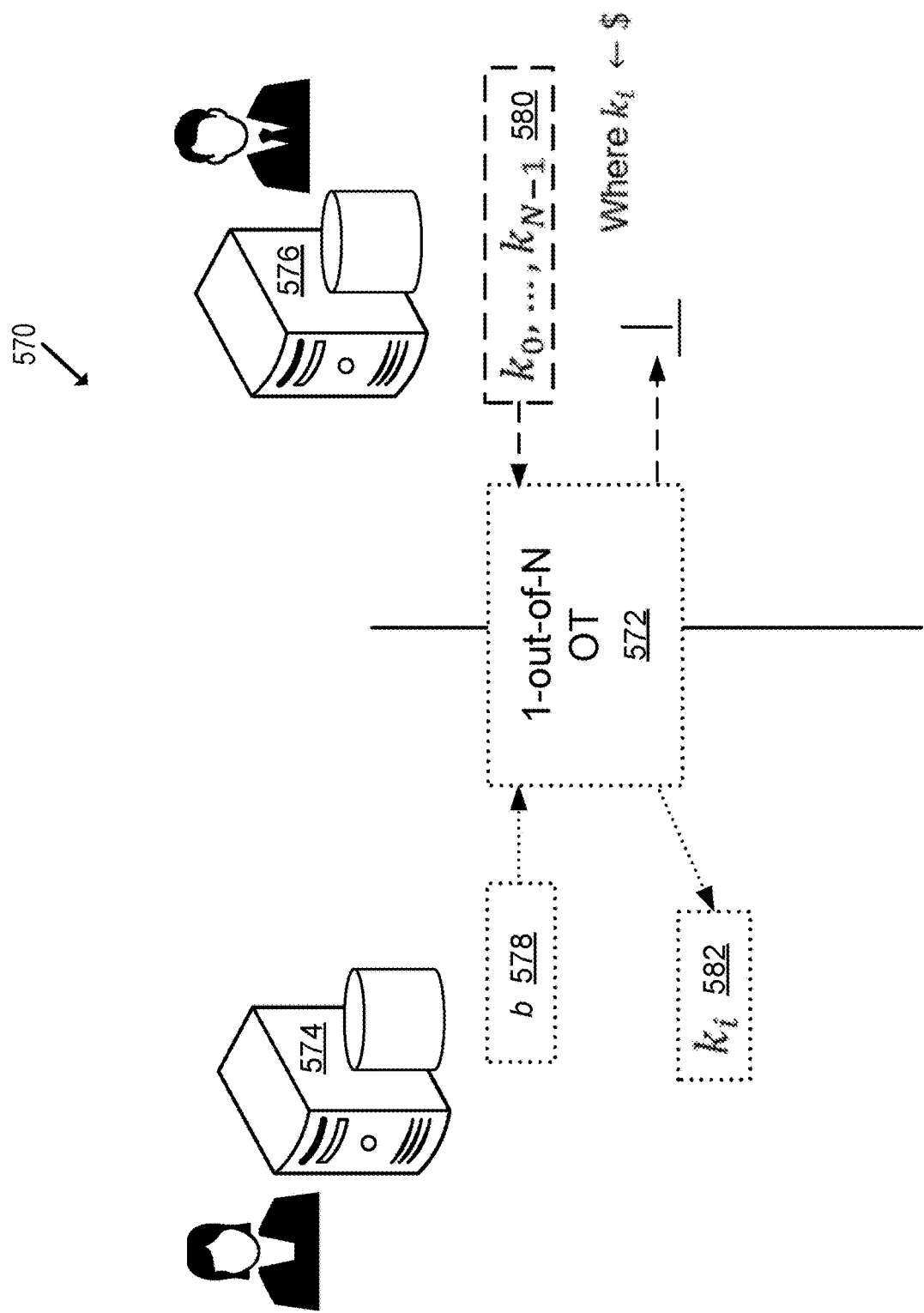
FIG. 5C depicts computing privacy-preserving multiplication in an amortized setting, according to an embodiment.

FIG. 5C depicts computing privacy-preserving multiplication 570 in an adaptive amortized setting based on 1-out-of-N Oblivious Transfer 572, according to an embodiment. Adaptive refers to a change over time, or in subsequent iterations, of the input messages to the OT 572. In this example, the first computer 574 is operated by Alice, and the second computer 576 by Bob. The first computer 544 can maintain Alice's stable data value x, as in the examples of FIGS. 5B and 5C. The second computer 576, however, can input changing values $y_1, \ldots, y_2$ as Bob's message. The multiplication result may be $xy_1, \ldots, xy_2$, respectively.

The disclosed method of FIG. 5C may reduce the computational complexity of secure multiplication. In particular, this method may require fewer instances of OT than the straightforward application for each component of the data points and cluster locations, as described above, and further the number of OT instances required may be independent of N.

However, later iterations of k-means clustering may reuse the already-performed OT from the first iteration for the first two terms. Therefore, later iterations only need $md\ell'$ instances of OT to compute the last term of the $D_{Euc}$ cross-term.

Accordingly, a total cost of the k-means clustering process is $(2n+m)d\ell'$ instances of OT. For example, if n=1,000, m=10, and t=50, the disclosed solution shows a factor of 200-fold improvement. In a further example, if n=10,000, m=10, and t=100, the disclosed solution shows a factor of approximately 500-fold improvement.

5. Communication Flow Diagram

Figure 6:
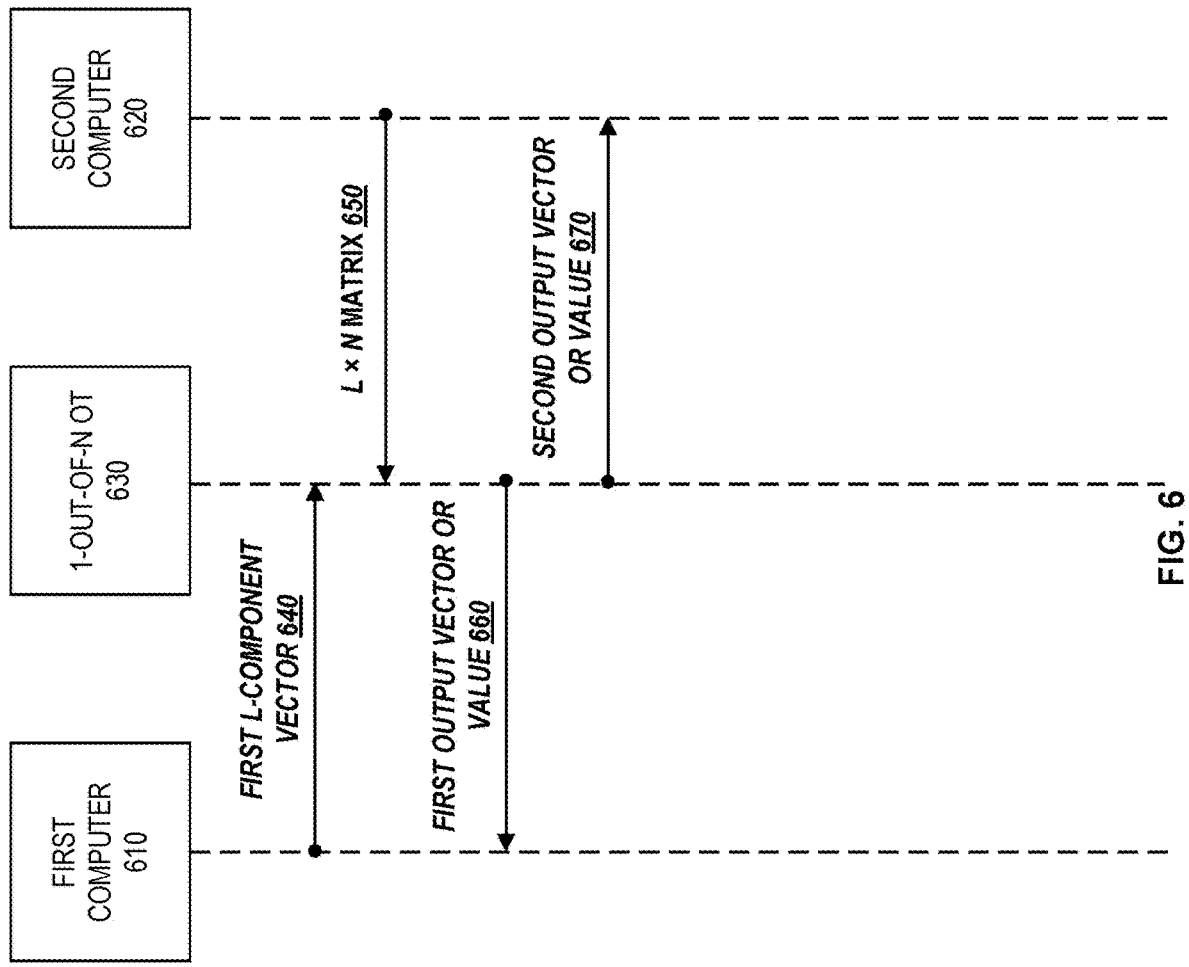
FIG. 6 depicts a communication flow diagram of a method for computing secure Euclidean distance based on 1-out-of-N Oblivious Transfer for privacy-preserving unsupervised learning, according to an embodiment.

FIG. 6 depicts a communication flow diagram of a method for computing secure Euclidean distance based on 1-out-of-N Oblivious Transfer (OT) 630 for privacy-preserving unsupervised learning, according to an embodiment. The method may be performed by a computer system such as system 200 in the example of FIG. 2, which may include a first computing device 610 (e.g., a computer or server operated by Alice) and a second computing device 620 (e.g., operated by Bob). In various embodiments, these components may include separate nodes or servers on one or more networks, such as the Internet, or may be hardware components or software modules implemented within one or more larger computing devices or systems. In addition, the data and/or messages described herein can be communicated directly between the components, multicast, or broadcast, and are not limited by the present disclosure. In an embodiment, the first computing device 610 and the second computing device 620 may jointly compute a secure distance, by performing privacy-preserving multiplication of a first data value x of the first computer and a second data value y of the second computer based on a 1-out-of-N OT 630 corresponding to a number N of shares.

Schematically, in this example the two computing devices 610 and 620 are shown as sending respective information to OT 630. As described in the example of FIG. 3 above, the actual OT may involve a sender (e.g., computing device 610) sending a message directly to a recipient (e.g., computing device 620). Aspects of the OT may be performed on the individual computing devices 610 and 620. Accordingly, the disclosed system and methods do not require a third computing device, such as a server, and thereby avoid any risk associated with the private data being stolen from the third device. Instead, the two computing devices 610 and 620 can interchange messages directly, while also preserving the privacy of each respective device's data, as disclosed herein. In particular, in some embodiments, messages sent to the OT 630 may be sent directly to the second computer 620. Such messages may be privacy-preserving, i.e. they may not contain enough information to reconstruct the respective sending computers' data values. The first data value x may belong to the first computer 610 (i.e., Alice), and the second data value y may belong to the second computer 620 (i.e., Bob).

In an embodiment, a first $\ell$-component vector 640 is transmitted from the first computing device 610 to the 1-out-of-N OT 630. The $\ell$-component vector 640 may be a base-N decomposition of the first data value. For example, if N=2, the $\ell$-component vector 640 may be a binary decomposition, and the components of vector 640 may be binary bits representing the first data value. In another example, if N=4, the $\ell$-component vector 640 may be a base-4 decomposition.

In an embodiment, an $\ell \times N$ matrix 650 is transmitted from the second computing device 620 to the 1-out-of-N OT 630. The $\ell \times N$ matrix 650 may comprise $\ell$ vectors with N components each. An ith respective N-component vector of the $\ell \times N$ matrix may have the index i of the respective decomposition coefficient and a second index j. In an embodiment, a first component $M_{i,0}$ of the ith respective N-component vector can comprise a respective pseudo-random number $r_i$. In an embodiment, this first component $M_{i,0}$ may the first index i and may have the second index equal to zero or one. A respective remaining component $M_{i,j}$ of the respective N-component vector, having the index i and having the second index equal to j, can comprise the second data value multiplied by j and by N raised to a power of i, minus the first component of the respective N-component vector.

Finally, an output vector or output value 660 is transmitted from the 1-out-of-N OT 630 to the first computer 610. According to the OT, as described in the example of FIG. 3 above, Alice's input $x_i$ may function as a selection or choice flag, which selects Bob's input $M_{i,x_i} = x_i y + r_i$. Here, $r_i = M_{i,0}$ may be the pseudo-random number. Thus, the ith component of the output vector 660 may comprise a component $M_{i,x_i}$ of the $\ell \times N$ matrix 650 (or the ith respective N-component vector of matrix 650), the component having the first index equal to i and the second index corresponding to the respective decomposition coefficient $x_i$ of the first data value in the base equal to N. In an embodiment $r_i$ may be sampled by the OT protocol and therefore $M_{i,0} = r_i$ may not need to be explicitly communicated.

In an embodiment, the first computer can instead receive an output value 660 from the 1-out-of-N OT. The output value 660 may comprise a sum over i of components of the respective N-component vector multiplied by N to the power i. A respective component in this sum may have the index i and have the second index corresponding to the respective decomposition coefficient of the first data value in the base N. That is, the output value may comprise $z^A = \sum_{i=0}^{\ell'-1} M_{i,x_i} N^i \in \mathbb{Z}_{2^\ell}$.

In an embodiment, the second computer may obtain a second output vector or value 670 from the 1-out-of-N OT 630. A component, having an index i, of the second output vector 670 may comprise a negative component $-M_{i,0}$ of the $\ell \times N$ matrix 650 (or the ith respective N-component vector of matrix 650). This negative component $-M_{i,0}$ may have the index i and the second index 0. That is, the ith component of the output vector 670 may comprise the opposite of the first component (having index 0) of the ith column vector of the $\ell \times N$ matrix 650 (also referred to as the ith respective N-component vector), comprising the opposite of the respective pseudo-random number $r_i$. In an embodiment, the first computer can instead receive an output value 670 from the 1-out-of-N OT 630. The output value 670 may comprise a sum over i of negative components $-M_{i,0}$ of the respective N-component vector multiplied by N to the power i, a respective negative component $-M_{i,0}$ within the sum having the index i and having the second index 0. That is, the output value may comprise $z^B = -\sum_{i=0}^{\ell'-1} M_{i,0} N^i \in \mathbb{Z}_{2^\ell}$.

Accordingly, in an embodiment, the final sharing of z=xy may be computed as a first output value 660 of $z^A = \sum_{i=0}^{\ell'-1} M_{i,x_i} N^i \in \mathbb{Z}_{2^\ell}$ for the first computing device 610 and a second output value 670 of $z^B = -\sum_{i=0}^{\ell'-1} M_{i,0} N^i \in \mathbb{Z}_{2^\ell}$ for the second computing device 620. Thus, the sum of the two output shares may correspond to the output of the shared multiplication, $z = z^A + z^B = \sum_{i=0}^{\ell'-1} x_i y N^i \in \mathbb{Z}_{2^\ell}$. Note that both shares preserve the privacy of the input values x and y. That is, the system can avoid leaking or revealing any information apart from the final multiplication output.

The first and/or second computer may then privately assign data to a respective cluster of a plurality of clusters based on the jointly computed secure distance.

C. Assigning Data Points to Clusters

As described in the examples of FIGS. 5A and 5B above, the system may compute the distance between points $p_i$ and cluster centroids $c_j$. In an embodiment, the system may form a matrix of such distances, $e_{i,j} = \text{dist}(p_i, c_j)$ for j=1, ..., m and i=1, ..., n. In order to assign data points to clusters, the system may determine the cluster j* having the minimum distance from a given data point $p_i$:

$$j^* = \underset{k \in [m]}{\text{argmin }} e_{i,j}.$$

Accordingly, the system can assign $p_i$ to the cluster $c_{k^*}$. This must be achieved without revealing the values of $p_i$, $c_j$, $e_{i,j}$ and j* to either party, i.e. the computation is performed on secret shares of these values.

In an embodiment, Alice and Bob may have separate shares of the distances $e_{i,j}$, i.e. Alice holds $e_{i,j}^A \in \mathbb{Z}_{2^\ell}^d$ and Bob holds $e_{i,j}^B \in \mathbb{Z}_{2^\ell}^d$. In particular, as described in the examples of FIGS. 5A and 5B above, Alice and Bob can have separate, locally computed portions of the distance, and can also have separate shares of the cross term or inner product. Accordingly, in order to compute $$j^* = \underset{j \in [m]}{\text{argmin }} e_{i,j},$$

the system may apply a garbled circuit. The system may present j* as a binary vector $J^* \in \mathbb{Z}_2^m$, where $J^*_{j^*}=1$, and where $J_k^*=0$ for all $k \neq j^*$.

An embodiment could be, for each i the parties input the binary decomposition of their share $e_{i,j}^A$, $e_{i,j}^B$ into a garbled circuit computation. In a recursive manner let us assume we have compute $J^0, J^1 \in \mathbb{Z}_2^{m/2}$ where $J^0$ is the argmin vector for $e_{i,1}, \ldots, e_{i,m/2}$ and $J^1$ is the argmin vector for $e_{i,2/m+1} \ldots, e_{i,m}$. Moreover, let $e^0$ and $e^1$ be the min value corresponding to $J^0$ and $J^1$. The final J* can be computed as $J^*=cJ^0 \| (1 \oplus c)J^1$ and $e^*=ce^0+(1 \oplus c)e^1$ where $c=1$ if $e^0>e^1$ and 0 otherwise. The comparison may be computed within the garbled circuit using the standard comparison circuit. The multiplication between c and $J^b$ along with c and $e^b$ can be performed within the garbled circuit or using the OT based multiplication protocol. Note that the base case of the recursion is a single $e_{i,j}$ which is the min by definition. Embodiments of the disclosed system may make use of other efficient solution for this conversion between share types. Furthermore, the disclosed system and methods may be more secure than existing approaches, in particular by preventing leaking the cluster identification j* with the minimum distance.

D. Updating Clusters

After assigning data points to the closest clusters, the system can further update the location of the centroid of each cluster: $c_k=\text{avg}(p)$, $p_i \in C_k$. Table 1 shows an example of a flag $M_{ik}$ for cluster assignment for data points $p_1$ through $p_4$. In particular, Table 1 shows, for cluster index k, the value of the flag $M_{ik}$, which indicates whether or not point $p_i$ is assigned to cluster k. For example, points $p_1$ and $p_3$ both are assigned to the cluster $k=3$.

TABLE 1

| k | $d_1$ | $d_2$ | $d_3$ | $d_4$ |
|---|---|---|---|---|
| 1 | 0 | 1 | 0 | 0 |
| 2 | 0 | 0 | 0 | 0 |
| 3 | 1 | 0 | 1 | 0 |
| 4 | 0 | 0 | 0 | 0 |
| 5 | 0 | 0 | 0 | 1 |
| 6 | 0 | 0 | 0 | 0 |

In an embodiment, the new cluster centroid can be computed according to:

$$c_k = \frac{\sum_{i=1}^n M_{ik} * p_i}{\sum_{i=1}^n M_{ik}} = \frac{\sum_{i=1}^n (M_{ik}^A \oplus M_{ik}^B) * (p_i^A + p_i^B)}{\sum_{i=1}^n (M_{ik}^A \oplus M_{ik}^B)}.$$

In this example, $M_{13}=0$ and $M_{33}=0$, so $p_1$ and $p_3$ do not contribute to the centroid calculation for cluster $k=3$.

Note that, in this formula, both the flag $M_{ik}$ and the coordinates of the data point $p_i$ are shared. Thus, a possible direct solution to this computation would be to convert the Boolean share (e.g., of $M_{ik}$) to an arithmetic share, or secure multiplication of $M_{ik}$ by $p_i$. However, in embodiments, the system may instead use two OTs.

V. Privacy-Preserving Clustering

Figure 7A:
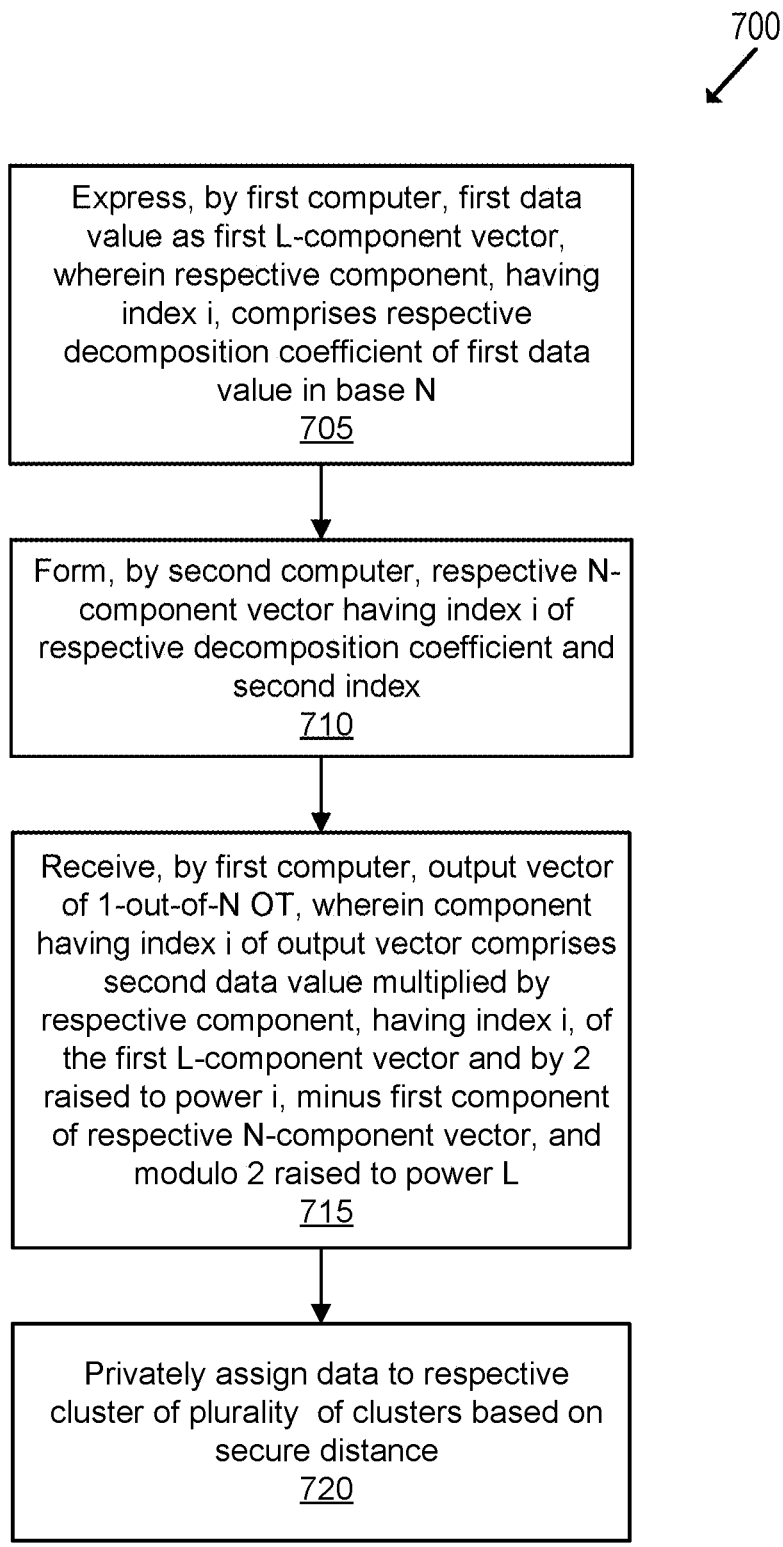
FIG. 7A depicts a flow diagram of a method for computing secure Euclidean distance based on 1-out-of-N Oblivious Transfer for privacy-preserving unsupervised learning, according to an embodiment.

FIG. 7A depicts a flow diagram of a method 700 for computing Secure Euclidean Distance based on 1-out-of-N Oblivious Transfer for privacy-preserving unsupervised learning, according to an embodiment. Method 700 can be performed by a computer system (e.g., system 200 in the example of FIG. 2), which may include a first computer (e.g., server 206) and a second computer (e.g., server 208).

In an embodiment, the first computer and second computer can jointly compute a secure distance. Jointly computing the secure distance may involve performing privacy-preserving multiplication of a first data value of the first computer and a second data value of the second computer, based on a 1-out-of-N oblivious transfer (OT) corresponding to a number N of shares.

In some embodiments, the privacy-preserving unsupervised learning may comprise k-means clustering, as in the example of FIG. 8 below. Alternatively, in some embodiments, the system may perform other types of clustering, such as hierarchical clustering, and is not limited by the present disclosure.

At step 705, the first computer may express the first data value as a first vector having a number $\ell$ of components. A respective component, having an index i, may comprise a respective decomposition coefficient of the first data value in a base equal to N. In particular, the $\ell$-component vector may be a base-N decomposition of the first data value. For example, if N=2, the $\ell$-component vector may be a binary decomposition, and the components of the vector may be binary bits representing the first data value. In another example, if N=4, the $\ell$-component vector may be a base-4 decomposition.

At step 710, the second computer may form an $\ell \times N$ matrix. A respective N-component vector of the $\ell \times N$ matrix may have the index i of the respective decomposition coefficient and a second index j.

In an embodiment, a first component of the respective N-component vector can comprise a respective pseudo-random number. In an embodiment, this first component may the index i and may have the second index equal to zero or one. A respective remaining component of the respective N-component vector, having the index i and having the second index equal to j, can comprise the second data value multiplied by j and by N raised to a power of i, minus the first component of the respective N-component vector.

At step 715, the first computer can receive an output vector of the 1-out-of-N OT. A component, having an index i, of the output vector may comprise a component of the respective N-component vector, the component having the index i and having the second index corresponding to the respective decomposition coefficient of the first data value in the base equal to N. In an embodiment, the first computer can instead receive an output value from the 1-out-of-N OT. The output value may comprise a sum over i of components of the respective N-component vector multiplied by N to the power i, a respective component in the sum having the index i and having the second index corresponding to the respective decomposition coefficient of the first data value in the base equal to N. That is, the output value may comprise $z^A = \sum_{i=0}^{\ell'-1} M_{i,x_i} N^i \in \mathbb{Z}_{2^{\ell'}}$.

In an embodiment, the second computer can obtain a second output vector of the 1-out-of-N OT. A component, having an index i, of the output vector may comprise a component of the respective N-component vector, the component having the index i and having the second index 0. That is, the component, having index i, of the output vector may comprise the first component of the respective N-component vector in step 710, comprising the respective pseudo-random number. In an embodiment, the first computer can instead receive an output value from the 1-out-of-N OT. The output value may comprise a sum over i of components of the respective N-component vector multiplied by N to the power i, a respective component in the sum having the index i and having the second index 0. That is, the output value may comprise $z^B=-\sum_{i=0}^{\ell'-1} M_{i,0}N^i \in \mathbb{Z}_{2^\ell}$. In an embodiment $r_i$ may be sampled by the OT protocol and therefore $M_{i,0}=r_i$ may not need to be explicitly communicated.

In an embodiment, N may equal 2 and the 1-out-of-N OT may comprise 1-out-of-2 OT. Alternatively, in an embodiment, N may equal 4 and the 1-out-of-N OT may comprise 1-out-of-4 OT.

In an embodiment, the first computer initially has the first data value and receives a first output share value. The second computer may initially have the second data value and may receive a second output share value. The first output share value and second output share value may sum to a product of the first data value and the second data value. Note that both shares preserve the privacy of the input values x and y. That is, the system can avoid leaking or revealing any information apart from the final multiplication output.

In an embodiment, the second data value may adaptively change. A later iteration may reuse the 1-out-of-N OT from a first iteration.

At step 720, the system may then privately assign data to a respective cluster of a plurality of clusters, based on the jointly-computed secure distance. Privately assigning data to clusters may be based on the methods disclosed above, and in the example of FIG. 7B below.

A. Assigning Data to Clusters

Figure 7B:
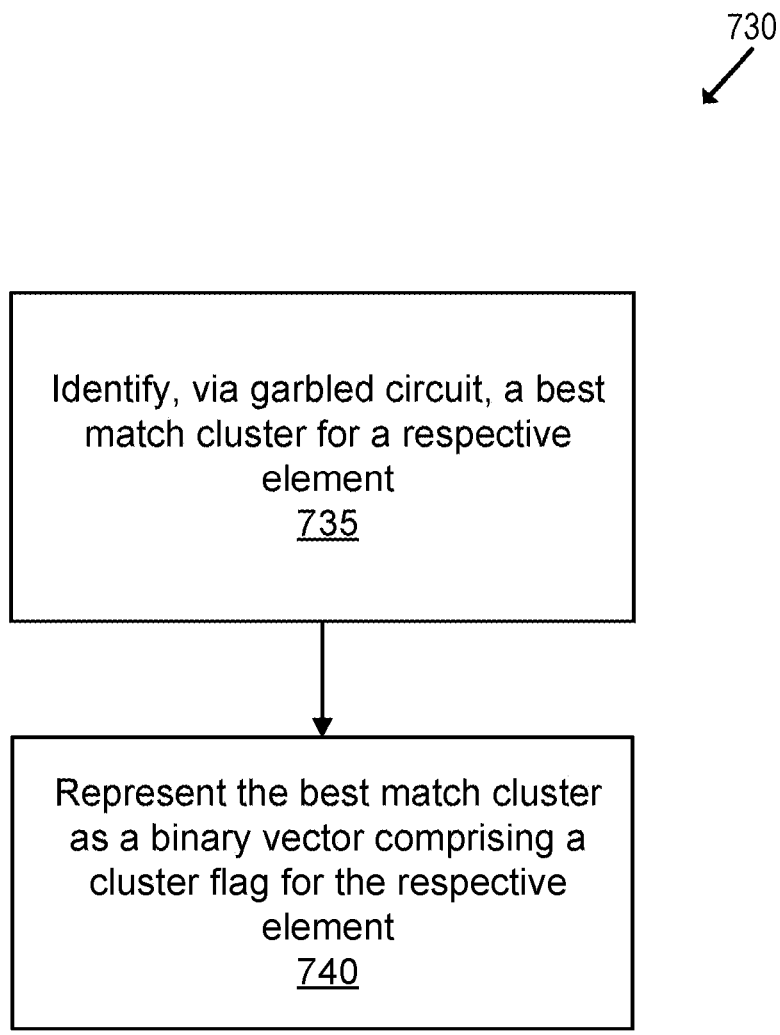
FIG. 7B depicts a flow diagram of a method for privately assigning data to clusters for privacy-preserving unsupervised learning, according to an embodiment.

FIG. 7B depicts a flow diagram of a method 730 for privately assigning data to clusters for privacy-preserving unsupervised learning, according to an embodiment. Method 730 can be performed by a computer system (e.g., system 200 in the example of FIG. 2), which may include a first computer (e.g., server 206) and a second computer (e.g., server 208). In an embodiment, method 730 may provide further detail of privately assigning the data to the respective cluster of the plurality of clusters, as in step 720 of the example of FIG. 7A.

At step 735, the system may identify, via a garbled circuit, a best match cluster of the plurality of clusters for a respective element of a plurality of elements of the data. The best match cluster may have a centroid with a minimum distance to the respective element. As described above, the system may apply the garbled circuit to compute $$j^* = \underset{j \in [m]}{\operatorname{argmin}}\, e_{i,j},$$

where $e_{i,j}=\operatorname{dist}(p_i, c_j)$ for $j=1, \ldots, m$ and $i=1, \ldots, n$.

At step 740, the system may represent the best match cluster as a binary vector comprising a cluster flag for the respective element. As described above, the system may present $j^*$ as a binary vector $J^* \in \mathbb{Z}_2^m$, where $J^*_{j^*}=1$, and where $J_k^*=0$ for all $k \neq j^*$.

B. Updating Cluster Centroids

Figure 7C:
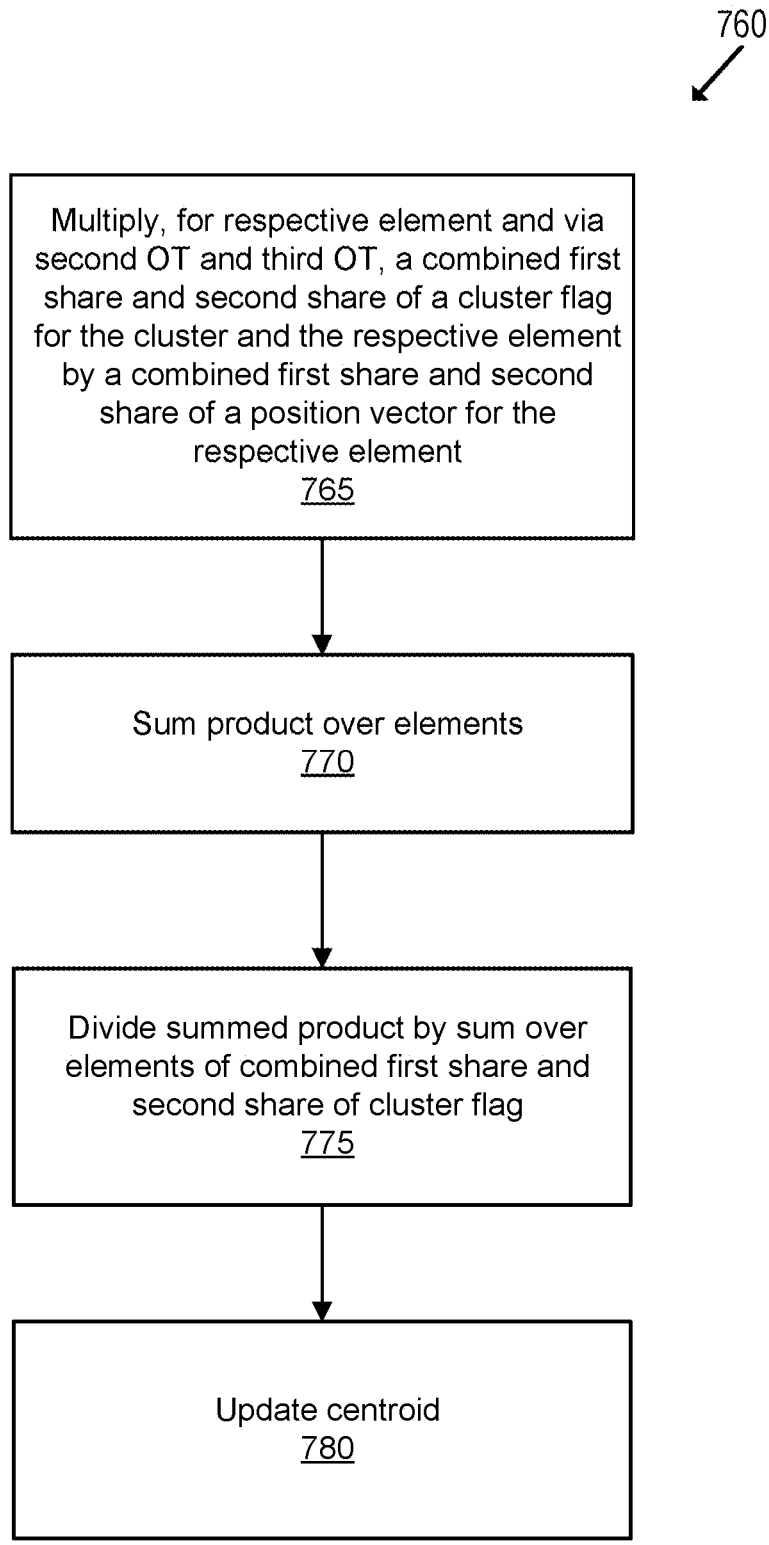
FIG. 7C depicts a flow diagram of a method for privately updating cluster centroids for privacy-preserving unsupervised learning, according to an embodiment.

FIG. 7C depicts a flow diagram of a method 760 for privately updating cluster centroids for privacy-preserving unsupervised learning, according to an embodiment. Method 760 can be performed by a computer system (e.g., system 200 in the example of FIG. 2), which may include a first computer (e.g., server 206) and a second computer (e.g., server 208). In an embodiment, method 760 may continue method 700 of the example of FIG. 7A by privately updating a centroid of a cluster.

At step 765, the system may multiply, for a respective element of a plurality of elements of the data and, a combined first share and second share of a cluster flag for the cluster and the respective element by a combined first share and second share of a position vector for the respective element. The multiplication may include performing a second oblivious transfer (OT) and a third OT. The first share of the cluster flag and the first share of the position vector may belong to the first computer. The second share of the cluster flag and the second share of the position vector may belong to the second computer.

In an embodiment, the first share and second share of the cluster flag are combined by exclusive OR.

At step 770, the system may sum a product of the multiplying over the plurality of elements. As described above, the system may form $\sum_{i=1}^n M_{ik}*p_i$ or $\sum_{i=1}^n (M_{ik}^A \oplus M_{ik}^B)*(p_i^A+p_i^B)$.

At step 775, the system may divide the summed product by a sum over the plurality of elements of the combined first share and second share of the cluster flag. As described above, the system may form $$c_k = \frac{\sum_{i=1}^n M_{ik}*p_i}{\sum_{i=1}^n M_{ik}} = \frac{\sum_{i=1}^n (M_{ik}^A \oplus M_{ik}^B)*(p_i^A+p_i^B)}{\sum_{i=1}^n (M_{ik}^A \oplus M_{ik}^B)}.$$

At step 780, the system may update the centroid based on a result of the dividing. Specifically, the new cluster centroid can be computed according to $c_k$, as in step 775. The system may then update the centroid coordinates for the kth cluster to $c_k$, and may subsequently use the updated coordinates when computing distances of the data points $p_i$ from the centroid for each cluster.

VI. Example for Unsupervised Learning

Figure 8:
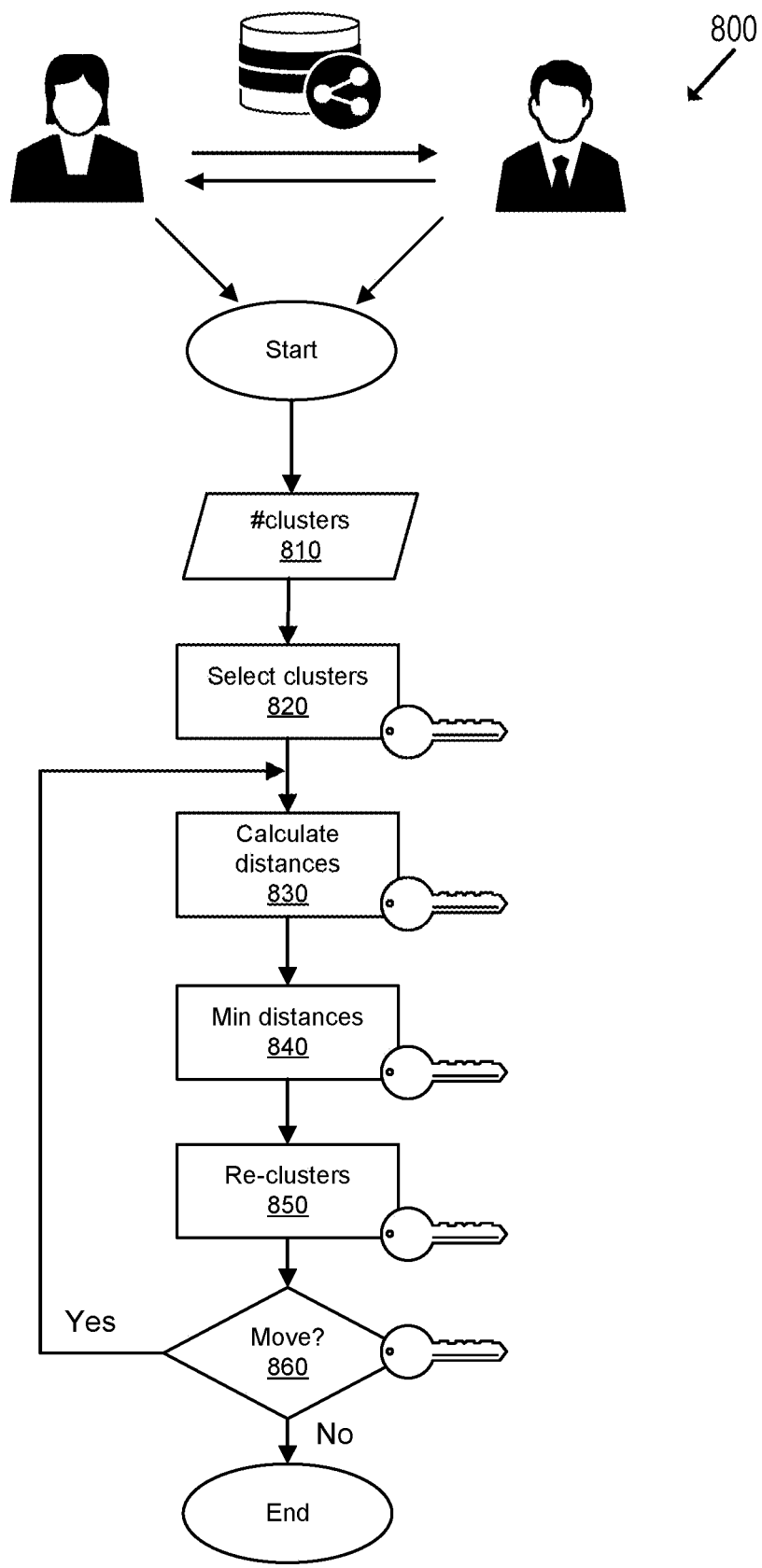
FIG. 8 depicts a flow diagram of an overall method for k-means clustering, according to an embodiment.

FIG. 8 depicts a flow diagram of an overall method 800 for k-means clustering, according to an embodiment. Method 800 can be performed by a computer system (e.g., system 200 in the example of FIG. 2), which may include a first computer (e.g., server 206) and a second computer (e.g., server 208). In an embodiment, method 800 may incorporate method 700 of the example of FIG. 7A for computing Secure Euclidean Distance into k-means clustering. In particular, the privacy-preserving unsupervised learning of method 700 may comprise k-means clustering, as in method 800.

At step 810, the system can first set the number of clusters equal to a value k. In some embodiments, k may be specified by a user.

At step 820, the system can then select k initial clusters of the data points. This may be done in various ways, e.g., by selecting the clusters randomly. In some cases, the initial choice of clusters is arbitrary, since the method may in any case eventually converge on optimal, or locally optimal, clusters. However, in some cases, the converged clusters may depend on the initial choice. The initial clusters may also be referred to as seed clusters.

Next, at step 830, the system can calculate the distances between the individual data points and all the cluster centroids. In some embodiments, the distances can be calculated in some other way, for example based on a respective cluster as a whole.

At step 840, the system may then assign each data point to a cluster to which the data point has the minimum distance.

At step 850, the system can then compute new cluster centroids based on the new assignments of data points to clusters.

At step 860, the system can then determine whether to perform another iteration. For example, the system can determine to perform another iteration if any of the cluster centroids have moved. If the system determines to perform another iteration, it can return to calculating the distances. If the system does not determine to perform another iteration, the method can end, resulting in the optimized, or locally optimized, cluster assignments.

VII. Computer System and Apparatus

Figure 9:
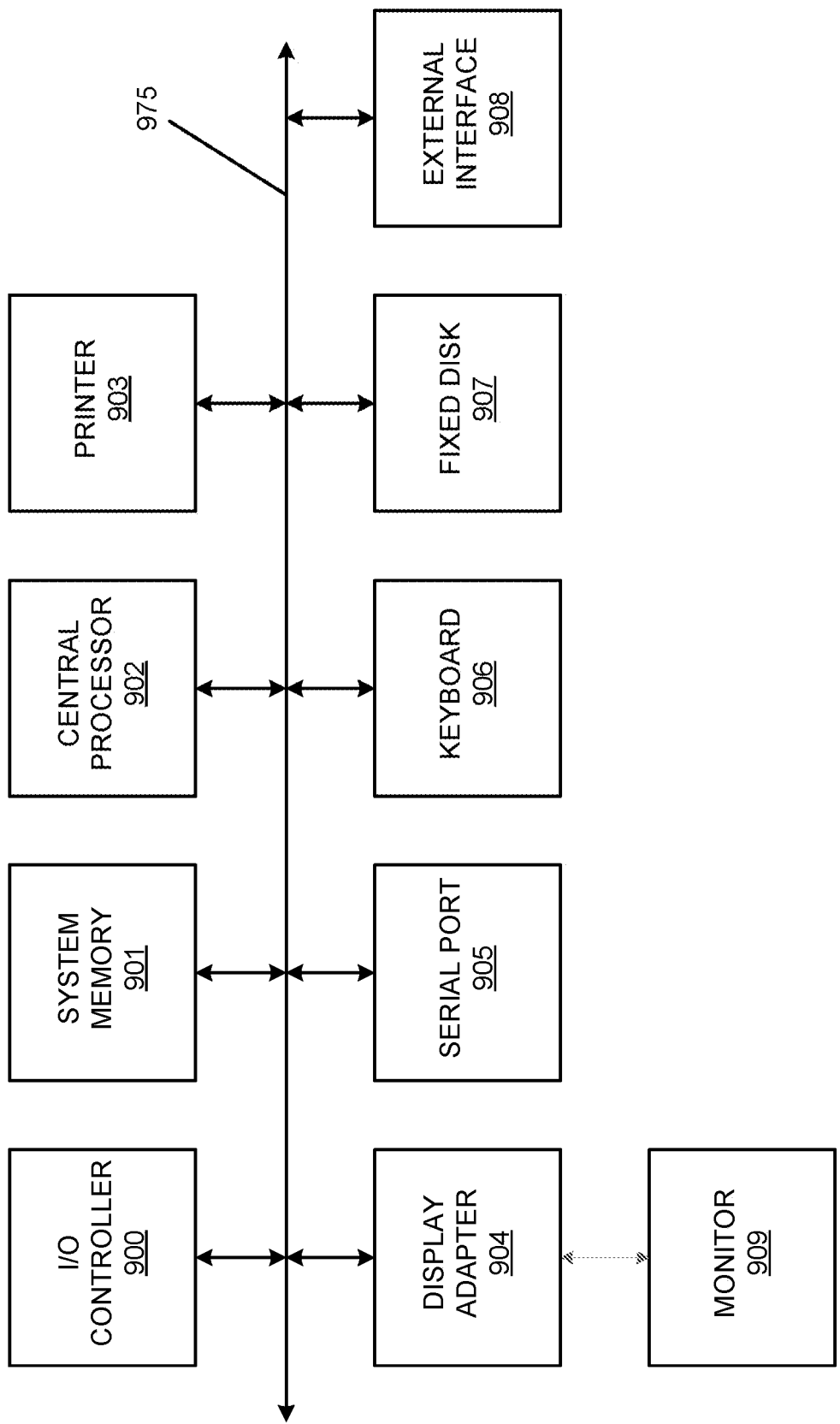
FIG. 9 depicts a high level block diagram of a computer system that may be used to implement any of the entities or components described above.

FIG. 9 depicts a high level block diagram of a computer system that may be used to implement any of the entities or components described above. The subsystems shown in FIG. 9 are interconnected via a system bus 975. Additional subsystems include a printer 903, keyboard 906, fixed disk 907, and monitor 909, which is coupled to display adapter 904. Peripherals and input/output (I/O) devices, which couple to I/O controller 900, can be connected to the computer system by any number of means known in the art, such as a serial port. For example, serial port 905 or external interface 908 can be used to connect the computer apparatus to a wide area network such as the Internet, a mouse input device, or a scanner. The interconnection via system bus 975 allows the central processor 902 to communicate with each subsystem and to control the execution of instructions from system memory 901 or the fixed disk 907, as well as the exchange of information between subsystems. The system memory 901 and/or the fixed disk may embody a computer-readable medium.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Embodiments of the disclosure provide for a number of advantages over conventional systems. For example, in various embodiments, the system and methods disclosed herein can improve the computational cost of OT-based multiplication by a factor of 1.2 to 1.7. In an adaptive amortized setting, the disclosed efficient multiplication may have a computational cost of $O((n+mt)d)$, vs $O(nmtd)$, an improvement of $nmt/(n+mt)$, where n is the number of points, m is the number of clusters, t is the number of iterations, and d is the dimensionality of the data points. In an example, if n=10,000, m=10, and t=100, the disclosed system and methods can show a factor of approximately 500-fold improvement. Moreover, the disclosed protocol is more efficient than generic secure protocol (MPC and FHE), and can scale to very large datasets.

In the preceding description, various embodiments have been described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of performing privacy-preserving unsupervised learning, the method comprising:
   jointly computing, by at least a first computer and a second computer, a secure distance, by at least performing a privacy-preserving multiplication of a first data value of the first computer and a second data value of the second computer based on a 1-out-of-N oblivious transfer (OT) corresponding to a number N of shares, the privacy-preserving multiplication further comprising:
  expressing, by the first computer, the first data value as a first vector having a number L of components, wherein a respective component, having an index i, comprises a respective decomposition coefficient of the first data value in a base equal to N; and
  forming, by the second computer, a respective N-component vector having the index i of the respective decomposition coefficient and a second index;
receiving, by the first computer, an output vector of the 1-out-of-N OT, wherein a component, having an index i, of the output vector comprises a component of the respective N-component vector, the component having the index i and having the second index corresponding to the respective decomposition coefficient of the first data value in the base equal to N;
privately assigning data to a respective cluster of a plurality of clusters based on the secure distance;
updating a centroid of a cluster by multiplying, for a respective element of a plurality of elements of the data and via a second OT and a third OT, a combined first share and second share of a cluster flag for the cluster and the respective element by a combined first share and second share of a position vector for the respective element, wherein the first share of the cluster flag and the first share of the position vector belong to the first computer, and the second share of the cluster flag and the second share of the position vector belong to the second computer;
summing a product of the multiplying over the plurality of elements;
dividing the summed product by a sum over the plurality of elements of the combined first share and second share of the cluster flag; and
updating the centroid based on a result of the dividing.

2. The method of claim 1, wherein:
a first component of the respective N-component vector, having the second index equal to 0, comprises a respective pseudo-random number; and
a respective remaining component, having the second index equal to j, comprises the second data value multiplied by j and by N raised to a power of i, minus the first component of the respective N-component vector.

3. The method of claim 1, wherein privately assigning the data to the respective cluster of the plurality of clusters further comprises:
  identifying, via a garbled circuit, a best match cluster of the plurality of clusters for a respective element of a plurality of elements of the data, wherein the best match cluster has a centroid with a minimum distance to the respective element; and
  representing the best match cluster as a binary vector comprising a cluster flag for the respective element.

4. The method of claim 1, wherein the first share and second share of the cluster flag are combined by exclusive OR.

5. The method of claim 1, wherein:
N equals 2 and the 1-out-of-N OT comprises 1-out-of-2 OT; or
N equals 4 and the 1-out-of-N OT comprises 1-out-of-4 OT.

6. The method of claim 1, wherein the secure distance comprises a secure Euclidean distance.

7. The method of claim 1, wherein:
the first computer initially has the first data value and receives a first output share value;
the second computer initially has the second data value and receives a second output share value; and
the first output share value and second output share value sum to a product of the first data value and the second data value.

8. The method of claim 1, further comprising obtaining, by the second computer, a second output vector of the 1-out-of-N OT, wherein a component, having an index i, of the second output vector comprises a component of the respective N-component vector, the component having the index I and having the second index 0.

9. A computing system comprising:
a first computer comprising a first processor;
a second computer comprising a second processor; and
one or more memories including instructions that, when executed with the first processor and/or the second processor, cause the computing system to perform a privacy-preserving unsupervised learning heuristic, comprising:
  jointly computing a secure distance, by at least performing a privacy-preserving multiplication of a first data value of the first computer and a second data value of the second computer based on a 1-out-of-N oblivious transfer (OT) corresponding to a number N of shares, the privacy-preserving multiplication further comprising:
    expressing, by the first computer, the first data value as a first vector having a number l of components, wherein a respective component, having an index i, comprises a respective decomposition coefficient of the first data value in a base equal to N; and
    forming, by the second computer, a respective N-component vector having the index I of the respective decomposition coefficient and a second index;
  receiving, by the first computer, an output vector of the 1-out-of-N OT, wherein a component, having an index i, of the output vector comprises a component of the respective N-component vector, the component having the index I and having the second index corresponding to the respective decomposition coefficient of the first data value in the base equal to N;
  privately assigning data to a respective cluster of a plurality of clusters based on the secure distance updating a centroid of a cluster by multiplying, for a respective element of a plurality of elements of the data and via a second OT and a third OT, a combined first share and second share of a cluster flag for the cluster and the respective element by a combined first share and second share of a position vector for the respective element, wherein the first share of the cluster flag and the first share of the position vector belong to the first computer, and the second share of the cluster flag and the second share of the position vector belong to the second computer;
  summing a product of the multiplying over the plurality of elements;
  dividing the summed product by a sum over the plurality of elements of the combined first share and second share of the cluster flag; and
  updating the centroid based on a result of the dividing.

10. The computing system of claim 9, wherein:
- a first component of the respective N-component vector, having the second index equal to 0, comprises a respective pseudo-random number; and
- a respective remaining component, having the second index equal to j, comprises the second data value multiplied by j and by N raised to a power of i, minus the first component of the respective N-component vector.

11. The computing system of claim 9, wherein privately assigning the data to the respective cluster of the plurality of clusters further comprises:
- identifying, via a garbled circuit, a best match cluster of the plurality of clusters for a respective element of a plurality of elements of the data, wherein the best match cluster has a centroid with a minimum distance to the respective element; and
- representing the best match cluster as a binary vector comprising a cluster flag for the respective element.

12. The computing system of claim 9, wherein the first share and second share of the cluster flag are combined by exclusive OR.

13. The computing system of claim 9, wherein:
- N equals 2 and the 1-out-of-N OT comprises 1-out-of-2 OT; or
- N equals 4 and the 1-out-of-N OT comprises 1-out-of-4 OT.

14. The computing system of claim 9, wherein the secure distance comprises a secure Euclidean distance.

15. The computing system of claim 9, wherein:
- the first computer initially has the first data value and receives a first output share value;
- the second computer initially has the second data value and receives a second output share value; and
- the first output share value and second output share value sum to a product of the first data value and the second data value.

16. The computing system of claim 9, wherein performing the privacy-preserving unsupervised learning heuristic further comprises obtaining, by the second computer, a second output vector of the 1-out-of-N OT, wherein a component, having an index i, of the second output vector comprises a component of the respective N-component vector, the component having the index I and having the second index 0.

17. A method of performing privacy-preserving unsupervised learning, the method comprising:
- jointly computing, by at least a first computer and a second computer, a secure distance, by at least performing a privacy-preserving multiplication of a first data value of the first computer and a second data value of the second computer based on a 1-out-of-N oblivious transfer (OT) corresponding to a number N of shares, the privacy-preserving multiplication further comprising:
  - expressing, by the first computer, the first data value as a first vector having a number L of components, wherein a respective component, having an index i, comprises a respective decomposition coefficient of the first data value in a base equal to N; and
  - forming, by the second computer, a respective N-component vector having the index i of the respective decomposition coefficient and a second index;
- receiving, by the first computer, an output vector of the 1-out-of-N OT, wherein a component, having an index i, of the output vector comprises a component of the respective N-component vector, the component having the index i and having the second index corresponding to the respective decomposition coefficient of the first data value in the base equal to N;
- privately assigning data to a respective cluster of a plurality of clusters based on the secure distance, wherein the privacy-preserving unsupervised learning comprises k-means clustering, the k-means clustering further comprising:
  - identifying a first cluster having a minimum distance to a respective position vector of a respective element of the data;
  - assigning the respective element to the first cluster; and
  - updating a first centroid of the first cluster based on an average of position vectors of elements of the data assigned to the first cluster, including the respective position vector.

18. The method of claim 17, wherein:
- a first component of the respective N-component vector, having the second index equal to 0, comprises a respective pseudo-random number; and
- a respective remaining component, having the second index equal to j, comprises the second data value multiplied by j and by N raised to a power of i, minus the first component of the respective N-component vector.

19. The method of claim 17, wherein privately assigning the data to the respective cluster of the plurality of clusters further comprises:
- identifying, via a garbled circuit, a best match cluster of the plurality of clusters for a respective element of a plurality of elements of the data, wherein the best match cluster has a centroid with a minimum distance to the respective element; and
- representing the best match cluster as a binary vector comprising a cluster flag for the respective element.

20. The method of claim 17, wherein the first share and second share of the cluster flag are combined by exclusive OR.

\* \* \* \* \*